(12) United States Patent
Willingham

(10) Patent No.: US 9,228,560 B2
(45) Date of Patent: *Jan. 5, 2016

(54) POWER GENERATING FLOATING VESSEL

(71) Applicant: Marjorie Willingham, Memphis, TN (US)

(72) Inventor: John Herman Willingham, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,209

(22) Filed: Jul. 8, 2014

(65) Prior Publication Data

US 2015/0008675 A1  Jan. 8, 2015

Related U.S. Application Data

(63) Continuation of application No. 13/303,251, filed on Nov. 23, 2011, now Pat. No. 8,772,957.

(51) Int. Cl.
*F03B 13/10* (2006.01)
*F03B 17/06* (2006.01)
*F03B 7/00* (2006.01)

(52) U.S. Cl.
CPC . *F03B 13/10* (2013.01); *F03B 7/00* (2013.01); *F03B 17/063* (2013.01); *F05B 2240/133* (2013.01); *F05B 2240/93* (2013.01); *F05B 2240/94* (2013.01); *Y02E 10/28* (2013.01)

(58) Field of Classification Search
CPC ............ F03D 3/067; F03D 7/06; F03D 9/008
USPC .......................................................... 290/55
See application file for complete search history.

(56) References Cited

U.S. PATENT DOCUMENTS

| | | | |
|---|---|---|---|
| 7,969,034 B2 * | 6/2011 | Winius .................. | F03B 17/063 290/43 |
| 8,772,957 B2 * | 7/2014 | Willingham .......... | F03B 17/063 290/55 |
| 2010/0108714 A1 * | 5/2010 | Bertucci .............. | G05D 11/006 222/57 |

* cited by examiner

*Primary Examiner* — Truc Nguyen
(74) *Attorney, Agent, or Firm* — William S. Parks; Hulsey, Hunt & Parks

(57) ABSTRACT

Hydroelectric generation devices, and more particularly fixed or floating paddlewheel electric generation devices that may be placed in any flowing liquid source in order to generate power, are presented. Such an overall power generating system includes a paddlewheel component that is situated within an artificial channel properly configured to increase the velocity of the flowing liquid therethrough, thereby providing a manner of generating paddlewheel rotation at a speed greater than that relative to the main body of the fluid itself. The inventive system thus permits power generation through the capture of the kinetic energy derived from the paddlewheel rotation at a level that is acceptable in relation to available hydrokinetic energy of the fluid source.

12 Claims, 17 Drawing Sheets

POWER GENERATING FLOATING VESSEL

CROSS-REFERENCE TO RELATED APPLICATIONS

This is a Continuation of pending U.S. patent application Ser. No. 13/303,251, filed on Nov. 23, 2011, the entirety thereof such parent application being incorporated herein by reference.

FIELD OF THE INVENTION

The present invention pertains to hydroelectric generation devices, and more particularly pertains to a fixed or floating paddlewheel electric generation device that may be placed in any flowing liquid source in order to generate power. Such an overall power generating system includes a paddlewheel component that is situated within an artificial channel properly configured to increase the velocity of the flowing liquid therethrough, thereby providing a manner of generating paddlewheel rotation at a speed greater than that relative to the main body of the fluid itself. The inventive system thus permits power generation through the capture of the kinetic energy derived from the paddlewheel rotation at a level that is acceptable in relation to available hydrokinetic energy of the fluid source. Such an efficient process thus allows for effective conversion of such hydrokinetic power into mechanical energy in order to couple to a device to produce electricity from such captured power. The resultant electrical energy can then be supplied to a user's individual location or into an electrical grid in order to supply a clean, efficient, power source at a level that exceeds 15 megawatt hours per day, at least, per device, depending on a minimum flow velocity.

BACKGROUND OF THE INVENTION

As the demand for energy grows, particularly in terms of energy sources that do not leave a carbon footprint or other potentially dangerous or unhealthy results, the search for alternative energy sources has likewise intensified. Coal plants generate carbon dioxide, mercury contaminants, and various other undesirable effluents that are released into the environment. Natural gas has been utilized to a certain extent to generate heat and thus power for electrical generators; however, such gas stocks are difficult to reach and their access has proven to be rather controversial on occasion. Not to mention, the high flammability of such a resource has led to disastrous consequences on occasion with pipeline leaks and other like problems. Nuclear power has merited scrutiny as the underlying technology is suspect for safety and the potential for very harmful releases due to natural disasters, let alone, potential military or other attacks. Each of these power generating methods also rely upon the building of new plants in order to increase the amount of power available to certain geographic areas that are growing in population every year. With regulations, costs, time lags, and other such logistic and practical issues, these typical and traditional power generating processes are not simple to implement. Furthermore, the fixed location of such plants leaves them susceptible to any number of natural and manmade problems, from natural disasters (such as tornados shutting down Tennessee Valley Authority nuclear plants in Alabama, or a tsunami literally destroying parts of a plant in Japan) to tragic human errors (such as the spillage of toxic coal waste in Tennessee, harming many acres of farmland and river sources, and shuttering the plant itself as a result) to worn out infrastructure issues (such as natural gas pipelines that have exploded due to earthquakes in the Middle East or due to deterioration over time in the United States, at least).

As has been quite noticeable in recent years, as well, electricity grids are highly dependent on the continual output of such coal, gas, and nuclear energy sources throughout the world. If disasters strike, as they have recently, and quite often, large swaths of populations may be left without power for unreasonable lengths of time. As the world has grown more and more dependent upon such available and relatively inexpensive energy sources for everyday activities, at least, there exists a need to provide not just cleaner sources of power around the globe, but sources that are reliable, plentiful, and inexpensive as well.

As alternatives, then, various natural, clean resources have been explored and/or revisited, albeit highly dependent upon government subsidies for implementation. For instance, wind power has proven to be relatively effective as an energy source, and more and more wind farms have been erected fairly recently as a result, at great cost to taxpayers. Unfortunately, such devices generate undesirable noise problems (and thus are considered nuisances to many that live within a certain distance from such farms) and, more importantly, are also at the mercy of actual wind sources; with low wind speeds, turbines may not properly rotate, thus reducing the effectiveness and efficiency of such devices. As well, large bladed wind turbines have been found to be potentially dangerous to the environment as certain species of birds have been harmed and even killed as a result of such machines. Another possibility, solar energy, has been considered and tried for many years in this respect. Although it has proven to be somewhat effective in the past, solar energy platforms are extremely expensive to implement; the costs involved with such systems have not been found to provide the necessary degree of efficiency to justify such outlays (and, again, have been largely subsidized through governmental payments rather than personal investments). Similar to wind power issues, solar energy generation is also dependent upon consistent exposure to the sun; in certain areas of the globe such a system would not function well if the sun were not readily available for photon capture over an appreciable period of time.

Water sources remain a viable option as a means of generating power, too. Unfortunately, though, past attempts at capturing hydrokinetic power have proven rather difficult to implement as well. The water wheel has been tried for many years, although this has been primarily a means to generate mechanical power through the flow of a stream present at an elevated height in relation to the wheel itself. Thus, such prior wheels (grist mills, for instance), depended upon the actual height of the water source in terms of potential energy to generate kinetic energy through the water drop on to the wheel blades (or like components). Such energy levels were sufficient for milling purposes in the past; in terms of electric generation, such devices would not attain sufficient kinetic energy for such a purpose. Hydroelectric dams have been constructed for many years, and at great cost, to provide electricity generation in certain geographic regions, as well. The necessity of preventing riparian or other water source flow in total through the erection of a dam, unfortunately, may cause environmental or other problems (lack of access to water in certain areas) that have proven, on occasion, to be more trouble than such an energy source is actually worth. As well, constant upkeep, regulatory compliance, and static location leave such energy generating alternatives suspect as well. Furthermore, as noted above, the costs with building such a dam, the time required to implement such a project, the environmental issues with potentially damaging aquatic creatures within the underwater turbines, and numerous other problematic concerns, leave such an electrical generating alternative as rather undesirable as a water source possibility.

Paddlewheel devices have been considered as alternative electrical generators in the past, too. Such prior devices have all involved either a fixed or floating vessel with at least one wheel component configured to rotate as the flow of water contacts immersed blades configured around its periphery. These previous paddlewheel designs all have the same limitations and drawbacks in that they all depend upon the flow speed of the water source directly to produce rotation of the target wheel component. In such a configuration, the water is thus supplied to the paddlewheel as it flows specifically within the water source. Thus, the current of the water in general, as it flows in contact with the wheel blades, and as it moves away from the wheel blades is substantially the same (in actuality, due to the open flow of the water source, and the force necessary to rotate the wheel through the blades, the current at the paddlewheel would be less than that of the water source itself). Such a result would create a highly inefficient method of power generation as the water flow speed would be the determining factor in the rotational speed generation of the wheel; with a low rotational velocity, the kinetic energy available for power generation would be rather low, effectively reducing the viability, if not reliability, of the overall system as a proper energy generating alternative to those described above.

Furthermore, even with paddlewheel devices that include open channels that provide a certain degree of water flow increase therethrough, such previous configurations have not imparted increases in water velocity above those expected for open channel designs. For example, the inclusion of outwardly curved pontoon floats (or attached walls) to a buoyant paddlewheel device would provide a limited increase of water flow; however, such a resultant transfer of kinetic energy would not provide a significant increase in overall power as such a straightforward open-channel design would not accord anything over a five to ten, at most, percent rise in water flow speed. To the contrary, to be effective in terms of causing necessarily high water flow speed increases, a design or configuration that allows for not only a doubling in water speed (at least), but also a significant increase force applied to the target paddlewheel blades during operation, would be of importance to create the most efficient electrical generation capabilities for a paddlewheel-based power plant. As such, open channel devices are too limited for such a purpose.

Thus, there remains a distinct need to provide an effective, reliable, clean, environmentally acceptable, efficient means to generate electrical power. The typical methods and the past alternative (clean) processes all exhibit significant drawbacks and deficiencies, as described above. As such, the potential for a moveable power generator that can utilize a natural riparian source at virtually any flow speed (such as, as examples, a river or tidal flow source) for effective electrical generation for either individual utilization or connection to a grid, is highly desirable. Additionally, a device that would also permit transport to any permissible and available geographic area for general and/or emergency power generation, as well as potentially accord a user the ability to provide not only power production, but also other beneficial services (emergency or otherwise), would also be a great necessity throughout the world. To date, again, the power generating industry has yet to provide such a highly beneficial system.

Advantages and Brief Description of the Invention

One distinct advantage of the present invention is the capability of generating power from a water source that is flowing at any velocity. Another advantage of this invention is the ability to maneuver the power generating vessel to any location on/or within a flowing water source as necessary to find the maximum water flow and/or to avoid watercraft or environmental or ecological concerns, and still generate significant levels of electricity therefrom. Yet another advantage of such a power generating floating vessel is the omission of any fossil fuels or other pollutants to accord proper function of the vessel either in terms of maneuverability or throughout the actual power generation procedures themselves. Likewise, still another advantage of such a vessel is the potential to provide proper housing to any workers present, with any power needed for such residents generated internally by the vessel on its own. Additional advantages include the incorporation of solar and wind power generators on the vessel to allow for base or extra electricity, either to operate the vessel or to feed into a grid or manufacturing process, as well as the capability to manufacture hydrogen, oxygen, potable water, and even, potentially, hydrogen peroxide, from the proximity to the target water source. Lastly, a major advantage of such an inventive power generating vessel is the potential to relocate it to a region that has suffered from a natural or manmade calamity and accord a reliable level of electricity in order to aid in rebuild and restoration thereafter.

Accordingly, this invention encompasses a paddlewheel power generation system, wherein said system comprises a suitable paddlewheel with multiple blades radially configured around the periphery of said paddlewheel, wherein said paddlewheel is situated within an artificial channel made from a solid material such that said channel includes a closed bottom portion, two closed sides, two open ends, and an open top portion, wherein said paddlewheel is positioned at a location above said artificial channel but also in a configuration to allow for a portion thereof to always be extended into said artificial channel but without coming into contact with any solid material of said artificial channel, and wherein said paddlewheel is situated to permit rotation thereof in the same direction as a fluid passing through said artificial channel.

Additionally, the invention encompasses the same base system wherein a flowing water source causes said paddlewheel to rotate, thereby capturing the hydrokinetic energy present within the flowing water source; and wherein said artificial channel is configured to generate a water flow velocity through said channel in excess of the water flow velocity of the flowing water source outside of said artificial channel. Such a power generation system as described broadly above and incorporated within a floating vessel that allows for proper water flow through said artificial channel for proper paddlewheel rotation to occur is also encompassed within this invention. The broad method of utilizing such a paddlewheel system as well as the floating vessel to permit electrical power generation from the hydrokinetic energy captured as a result of such increased water flow through the artificial channel (and thus contacting and rotating the paddlewheel) is also encompassed within the overall invention, as well.

As broadly stated, then, the basic inventive paddlewheel power generator is situated within the confines of an open channel that directs a flowing fluid (water) source in the direction of the wheel in order to contact and force the radially configured blades of the wheel to rotate. Such a channel, however, is not simply an arrangement that involves an opening created by two separate slabs of floating material that permits access of a floating wheel to contact flowing water between such floating material; to the contrary, the inventive device requires a channel that is closed on its bottom portion, thus providing an open end at its front and back as well as an open top portion. Such a channel imparts the potential for controlled water flow therethrough with clear access of the paddlewheel to depth within the channel whereby the rotating blades will not contact the bottom portion. Another way of visualizing such a channel is one of a trough exhibiting a width far shorter than its length that has had both short ends removed to permit unfettered fluid movement through the channel. The channel itself may actually comprise a base that is similar to a three-dimensional rectangle, including a water ingress end and a water discharge end (and thus, again, with both such ends removed to permit such ingress and discharge, as well as an open top portion to permit insertion and movement of the paddle wheel blades for water contact to occur). With such a configuration, the water flow velocity is controlled through a combination of the channel bottom and sides, as well as atmospheric pressure and gravity. The presence of a top portion of the channel actually reduces the water flow, as opposed to the unexpected discovery that an uncovered channel in this respect generates unforeseen velocity increases to permit effective hydroelectric paddlewheel results, as discussed and shown herein.

The prior art noted above is not concerned in any manner with such a closed-bottom channel system. The closest teachings that pertain to paddlewheel systems at all are limited to devices that have open-water paddlewheels on either side of a float, and thus are limited in terms of water flow access to the water flow velocity inherently generated by the water source itself. Without any directed or controlled water movement and flow, such devices are unreliable to provide consistent and continuous paddlewheel rotation, thus potentially limiting the power generation capabilities thereof. Likewise, some devices include a single paddlewheel present between two separate floats, but without, again, any controlled manner of directing target water sources to flow specifically or at any desired velocity upon contact with the target paddlewheel blades. This, too, drastically limits the capability of such a system to produce a reliable and consistent level of power, let alone a high level of electricity generation as a result. As such, the utilization of a closed-bottom artificial channel (i.e., a venturi) actually provides far improved control in terms of water flow velocity through the channel and, consequently, in terms of hydrokinetic energy levels as the water flows and contacts with the target paddlewheel blades. Importantly, such a closed-channel configuration allows for forced delivery of flowing water to the paddlewheel blades, as well. The directed water flow in this manner, even when immersed within a flowing water source, exhibits an increased velocity, at least, through the channel, and, surprisingly, transfers greater force to the paddlewheel effectively imparting a faster and/or stronger rotation that translates into higher energy output. Thus, the overall capability of a standard paddlewheel generator is unexpectedly boosted with the inclusion of a closed-bottom channel for such a purpose, to the degree that the power level generation potential is roughly equal to the cube of the water flow velocity measured through the venturi as it contacts the paddlewheel (particularly with a proper venturi egress component that allows for proper water exhaust velocity to prevent any backflow but deposit within the external flowing water source subsequent to paddlewheel contact).

As well, in order to accord an overall system that optimizes water flow velocity through such an artificial channel, specifically in comparison with the flow of the external water source itself, the inventive system includes, in another possible embodiment, a channel configured in a way wherein the bottom portion and/or the side walls thereof are curved, rather than solely constituting right angles. It has been determined, in other words, that water flow velocity may be increased through the artificial channel upon the introduction of a curved (such as, as one example, one side of a rough cumulative distribution function curve shape with a relatively low peak) floor that rises from the point of ingress to a point preceding contact with the paddlewheel blades. A substantially symmetrical configuration (i.e., the shape of the ingress portion and the egress portion are substantially the same but in reverse) for the discharge portion of the venturi may thus be employed as well in order to generate an appropriate water flow velocity subsequent to contact with the paddlewheel to prevent any reduction in water speed that may deleterious effect the overall water flow through the venturi itself. Additionally, or alternatively, the side walls of the artificial channel may also include curved configurations to accord possible water flow velocity increases through the channel itself. Such configurations may create a laminar (smooth) water flow to permit increased flow speeds at the top of such curves, thereby providing the potential for water speed to increase for, again, more effective paddlewheel rotation. Thus, a combination of a curved floor and curved channel sides may also be employed simultaneously to accord such water flow velocity increase results, too. The possible configurations to that end are myriad in nature, with any number of variations available to permit such desirable water flow increase results.

Additionally, the inventive paddlewheel system has been alternatively designed in terms of different channel components to accord such desirable water flow increase possibilities. In one possible embodiment, the overall system is split into three different channel portions (i.e., modular components): a water ingress component (B), a water/paddlewheel contact component (A), and a water discharge component (C). As such, this configuration model has not only facilitated manufacture of different channels for experimentation and use, but also has provided an effective basis with which to measure the resultant hydrokinetic power levels and further permit proper extrapolations for overall electricity generation estimates in relation thereto. Such different channel components have been provided, as one non-limiting example, a configuration whereby the opening of the water ingress component begins at a certain depth (at its leading edge) within a flowing water source, the floor thereof rises in a rough cumulative distribution function curve-shape (with the height of the water/paddlewheel contact component being the variable to which the curve is set), thus creating a pressure increase to the water source with the channel bottom "squeezing" the flowing water in tandem with the water's surface tension (as well as atmospheric pressure and/or gravity, presumably), to noticeably cause an increase in the water flow velocity through the ingress component itself. At the end of this component B (i.e., its finishing edge), the curve rise tapers off, leading to a water/paddlewheel contact component (A), at its own leading edge. This A component may be of any configuration that permits proper rotation of the paddlewheel (i.e., avoids any contact with the channel solid portions), and thus may utilize a proper curved slope that allows for such rotation to occur as well as transport of the water source therethrough. Such a curve may also allow for increased water flow velocity to a certain degree, thereby aiding to impart such a necessary characteristic for the overall purpose of the inventive device. However, it has surprisingly been found, at least at a smaller scale, that the utilization of an A component that exhibits about a 9 degree rise from the end of the ingress component to the mid-point of component A and then a drop at the same rate to the beginning point of the egress component (at component A's finishing edge and component C's leading edge), permits generation of the highest water flow velocity through the entire inventive open-channel device. As such, although any configuration for component A may be employed, the unexpectedly effective results with a rising trough for this component provides the most efficient results for such a purpose. Again, though, any internal configuration of component A may be utilized (with any degree of curvature of the trough, for example) as long as the paddlewheel's rotational movement is not impeded thereby.

As alluded to above, the trough of component A then rises to substantially the same level as at the end of the ingress component (its finishing edge) at the point the contact component becomes component C (again, its leading edge), the water discharge portion (which is preferably at roughly the same height as the end point of the ingress channel of component B as it meets component A). Such a discharge component must also be close-bottomed in configuration to permit the water present within the channel to properly empty outwardly into the flowing water at a sufficient speed and direction to prevent any back pressure creation which could reduce the exit water flow speed if present. As such, although component C is not required to be symmetrical to component B, at least substantial similarity has been determined, again, to accord the best overall results in terms of retaining a high water flow velocity throughout the entire venturi during operation of the paddlewheel (and thus the shape of component A as seen from its leading edge to its finishing edge would be the reverse of that as seen for component C from its leading edge to its finishing edge). Thus, at the point component A attaches (in flush relation) to component C the floor level is initially higher than the egress point of the discharge component (C) (its finishing edge), again, much like the configuration for ingress component A. Such distributive function curved (or other like curved shape) floor configurations for the venturi within the overall paddlewheel system may thus provide at least a doubling in the water flow velocity through the system in relation to the water flow velocity of the water source itself. Such an increase, the increased force applied to the paddlewheel blades by a combination of the overall water flow speed as well as the possible water force created by the trough component of the overall device appears, without relying upon any specific scientific theory, to impart a significant increase in the hydrokinetic energy harnessed by such a paddlewheel system in comparison with open-channeled and/or non-channeled systems of the past. The efficiency level of such a novel closed-channel paddlewheel system is thus well above that for previous devices and has been calculated to economically exceed an electrical generation capability of a range including about 15 to about 60 and even higher megawatt hours per day through a single system with a water source flow velocity measured to be 7 miles per hour (i.e., the rough flow rate of the Mississippi River at Memphis, Tenn.). Such a result has never been approached with a paddlewheel system in the past.

The paddlewheel itself may be of any width and circumference, but, preferably, in terms of utility and ease in manufacture, as well as efficiency overall for power generation in relation to a flowing water source, the dimensions should range from 15 to 80 feet high and from 6 to 80 feet wide (as merely examples) when implemented within a large-scale floating vessel arrangement. The paddlewheel blades may be of any number evenly distributed around the wheel periphery, as well as any general configuration themselves to permit proper entry and removal from the flowing water source during operation, while also providing the greatest degree of contact, and thus available force applied thereto, by the flowing water itself. Additionally, however, the blades may be manufactured and supplied in such a manner as to exhibit a sharp angle to pierce through the water surface (and thus to overcome the surface tension level thereof) more easily in order to reduce drag over the entire rotating device during use, thereby optimizing the power generating capability by transferring as much force from the water flow to the power generation device. As well, such blades may be adjustable to shift in opposite directions, depending upon the water source flow direction. In such a situation, then, the operator may keep the floating vessel stationary and allow for a change in water flow direction by adjusting the blades accordingly, rather than having to adjust the position of the craft itself. Lastly, then, the blades may include a flange or flaring at their ends in order to capture as much flowing water during each individual blade's entry and movement through the flowing water during operation.

Thus, a base paddlewheel system is herein described that can be properly incorporated into a floating vessel, such as, as one example, a barge, that can properly navigate through a flowing water source to a desired location from which ingress within the venturi, and thus through the paddlewheel contact component and out the discharge component of the closed-bottom channel is permitted. The paddlewheel may then be attached to, connected to, or otherwise associated with a further power generator that captures the kinetic energy output of the rotating device supplied solely by the velocity of the flowing water source. Additionally, the paddlewheel itself may include a properly configured dynamo with a stationary copper coil as the axle (or axis) and a magnetic rotor that rotates with the rotation of the paddlewheel during hydrostatic operation. In essence, any type of electrical, hydraulic, mechanical, and the like, power generation may be accorded through the utilization of this hydrokinetic device through a simple connection thereto (or, incorporation, as with the potential axle dynamo configuration therein).

Hence, with the capability to generate such power, the potential to capture and/or store electrical charge (and thus energy) produced thereby is also possible through any number of alternatives, including direct transfer to a power grid, storage in a battery form, and the like, as attached to or located on an inventive floating vessel including such a new paddlewheel system.

These and other objects, features, and advantages will become apparent to those skilled in the art upon a perusal of the following detailed description read in conjunction with the accompanying drawings and appended claims.

BRIEF DESCRIPTION OF THE DRAWINGS

FIG. 7A is an enlarged cross-sectional view of the specific weight test device of FIG. 7.

FIG. 8A is an enlarged cross-sectional view of the specific weight test device of FIG. 8.

FIG. 9A is an enlarged cross-sectional view of the specific weight test device of FIG. 9.

DETAILED DESCRIPTION OF THE DRAWINGS AND PREFERRED EMBODIMENTS

In order to allow for initial testing and investigation into the viability of the inventive paddlewheel system, laboratory scale devices were constructed of a rough 1:20-1:25 size in comparison to that of the finished system to be included within the overall inventive power generating floating vessel. In this manner, a controlled experiment was permitted to assess the mechanical capabilities of the scale system in relation to a flowing water source. The results obtained therefrom have provided a proper basis for extrapolating reliable power generation results as well as, ultimately, providing measurements for expected electricity generation potentials. As such, however, it should be evident that the overall size of the inventive paddlewheel system is not limited to any degree; as long as such an overall inventive configuration functions properly with any flowing water source to generate any power level, and thus any degree of electricity generation as a result, then such a system falls within the scope and bounds of the invention.

Figure 1:
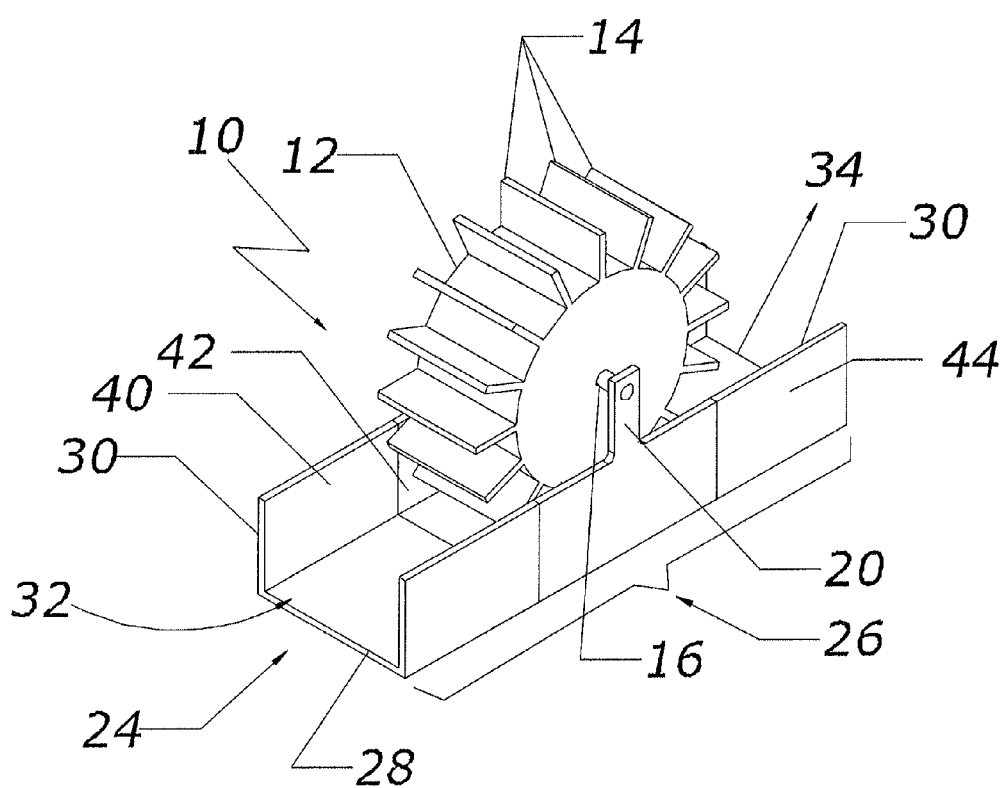
FIG. 1 is a perspective view of the paddle wheel electric generation device of the present invention illustrating the paddle wheel present in combination with a flat-bottomed venturi.

FIG. 1 thus provides a view of one possible laboratory-scale embodiment of the inventive paddlewheel system 10 including a paddlewheel 12 with a plurality of radially configured blades 14 (here there are sixteen, all evenly spaced apart around the periphery of the wheel 12)(note that such blades may be provided in straight configuration, or arced, angular, provided with a piercing edge of some type; in other words, any shape blade may be utilized). A shaft 16 extends through the middle of the wheel 12 and is attached to an elevated transom 18 through two pillars 20, 22 that provide support to the shaft 16 in order to ensure the wheel 12 remains in a substantially straight up position to permit rotation of the wheel 12 around the shaft 16 to permit the blades 14 to contact with a flowing water source 24. Also included with this system 10 is a venturi 26 (closed-bottom channel) through which the water source 24 flows in a directed manner. The venturi 26 includes a closed bottom portion 28 and two parallel side walls 30 situated in the lengthwise direction of the venturi 26. The venturi 26 also includes two openings 32, 34 at the point of ingress for the water source 32 and the point of egress (or discharge) of the water source 34. The wheel 12 is then situated essentially over the venturi 26, and extended to a level at which at least a plurality of blades 14 (here, at least four) are extended below the upper levels 36 of both parallel side walls 30 of the venturi 26. In this manner, the water source 24 will always be in contact with such a number of extended blades 14 into the venturi 26 through which the water source 24 flows during operation. The directed water source 24 thus moves through the venturi 26 and contacts the blades 14 in such a manner as to create rotation of the wheel 12. Importantly, the wheel 12 itself does not contact any portion of the venturi 26; it remains, as noted above, suspended over and into the open area of the venturi 26 in order to permit engagement by the flowing water source 24 to create rotational energy thereto, ultimately to generate power within a connected generator (such as 150 in FIGS. 6, 7, 8, and 9).

As alluded to above, the overall venturi 26 may be split into three distinct sequential units (B, A, and C) 40, 42, 44, with the first being the water ingress component 40 (B), the second being the wheel/water contact component 42 (A), and the third being the water egress (discharge) component 44 (C). In FIG. 1, the venturi 26 is limited to a straight edge, flat floor 28 at right angles to the flat parallel side walls 30; the entirety of the venturi 26, and thus each of the three sequential units 40, 42, 44, exhibit the same straight edged configurations throughout. This overall system 10 thus includes a straight venturi 26 that delivers a water source through its open-top channel to allow for increased force upon the blades 14 of the wheel 12 to create the needed rotational energy for eventual power generation.

Figure 2:
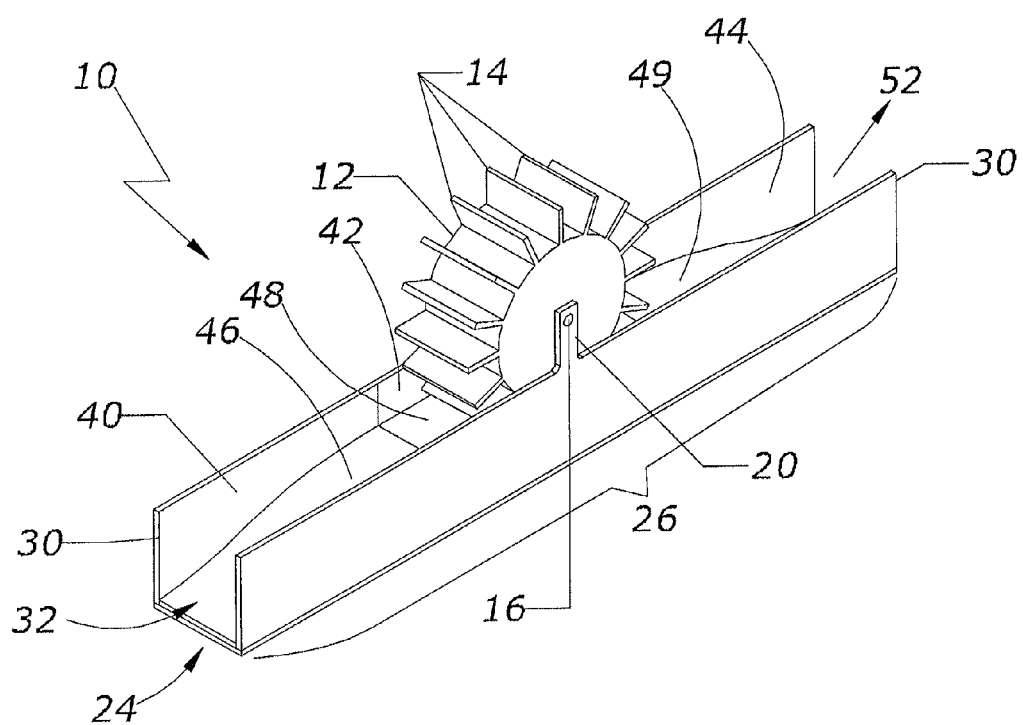
FIG. 2 is a perspective view of the paddle wheel electric generation device of the present invention illustrating the paddlewheel present in combination with a curved-bottom venturi and a suitable trough for the area in which the paddlewheel will contact a flowing water source.
Figure 3:
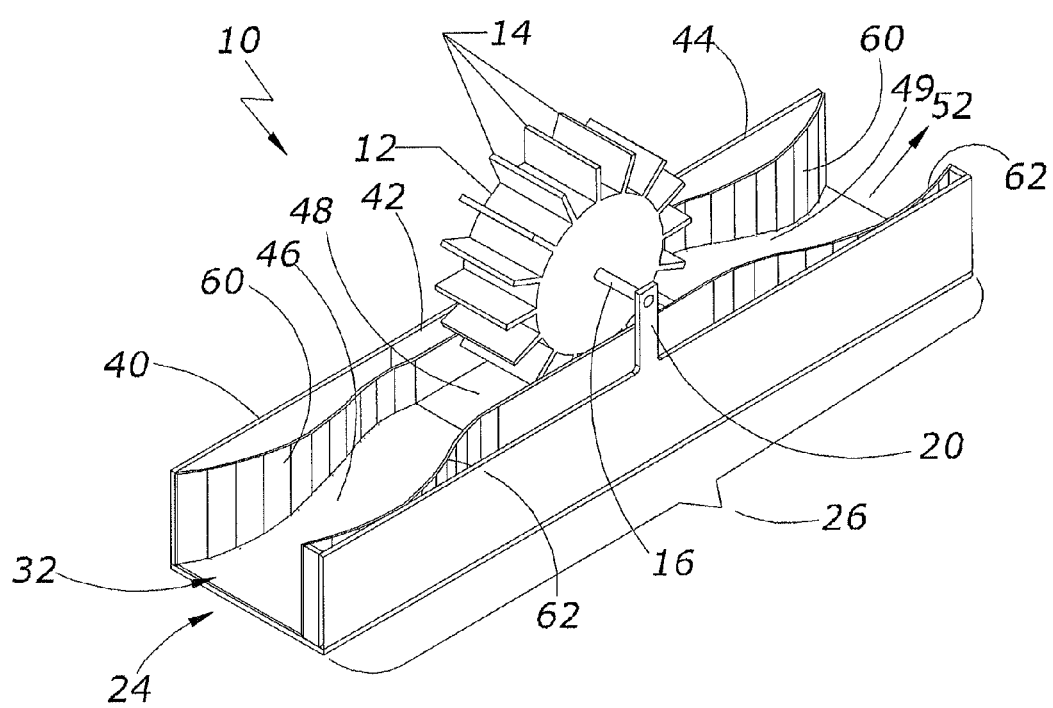
FIG. 3 is a perspective view of the paddle wheel electric generation device of the present invention illustrating the paddlewheel present in combination with a curved-bottom venturi including curved side walls as well, and additionally including a suitable trough for the area in which the paddlewheel will contact a flowing water source.

FIGS. 2 and 3 show different venturi configurations from that of FIG. 1 (as likewise laboratory-scale designs), particularly in the floor portions thereof. In these two alternative designs, and thus potentially preferred embodiments (again, any number of embodiments fall within the scope of this invention as long as a closed-bottom channel is utilized, or, to a narrower extent, such a venturi with a non-uniform floor level, such as, as discussed here, a rising curvilinear or distribution function floor design), the base venturi 26 of FIG. 1 is actually still in place. However, unique additions to the floor (FIGS. 2 and 3) and the side walls (FIG. 3) have been included to create the above-noted curved shapes therein. For simplified manufacture (but not as any required configuration that must be utilized in conjunction with the inventive system or any related device), as described above, the individual ingress and egress units 40, 44 of FIGS. 2 and 3 are constructed to include these curved portions to the degrees shown therein. Thus, in FIG. 2, the ingress portion 40 includes a rising rough distribution function-shaped floor 46 that runs the entire width between the parallel side walls 30 as well as the length of the bottom floor 28 until reaching a plateau at the point of attachment to the water/wheel contact component 42.

At that point, the floor may take any configuration that permits the wheel clearance to rotate through this region without contacting any of the solid portions of the venturi. Thus, the floor 48 may be formatted as a sloped trough, a squared trough, or, more preferably, either a flat level at the same height as the ending point of the ingress component 40 or a further rising curve (up to about 9 degrees rise, for example, from the ending point of the ingress component 40, as in FIG. 4). Thus, the water flow through the water/wheel contact component 42 will be at the same level as it enters such a component as well as once it exits into the egress (discharge) component 44. As well, the water flowing therethrough into this region 42 allows for sufficient contact with the rotating paddlewheel blades 12 to cause the wheel itself to rotate as needed for power generation. In this overall (potentially preferred) configuration, the discharge portion 44 is substantially symmetrical to that of the ingress component 40, thus including a descending decreasing rough distribution function-shaped curve 49 leading to the end opening for water discharge 52. The trough floor 48 and the floor of the discharge portion 49 are similarly configured widthwise between the two parallel side walls 30 of the venturi 26 just as provided with the ingress portion 140.

FIG. 3 includes the same floor configurations as in FIG. 2, with the side walls 30 including curved additions 60, 62 within the ingress and egress components 40, 44. The resultant design provides S-curves 60, 62 that are of substantially the same degree within both ingress and egress components 40, 44 (and similar in terms of the shape accorded the floor through the utilization of a rough distribution function to determine the curve shapes therein). The trough 48, however, remains the same as in FIG. 2.

Figure 4:
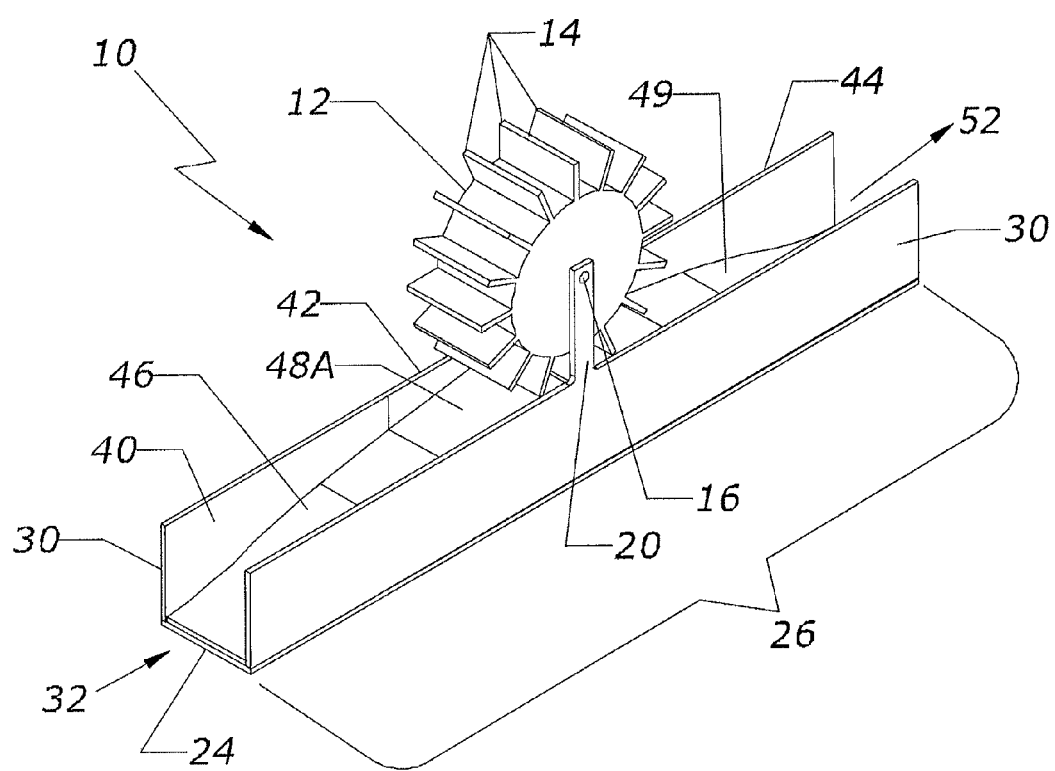
FIG. 4 is a perspective view of the paddle wheel electric generation device of the present invention illustrating the paddlewheel present in combination with a rising venturi floor and a convex paddlewheel/water contact region.

FIG. 4 includes the same rising and falling slope configurations for the ingress and egress components 40, 44 as in FIG. 2. The paddlewheel/water contact component 42 includes a convex floor configuration 48A instead of a flat or concave floor, with the side walls 30 remaining straight and parallel.

Figure 5:
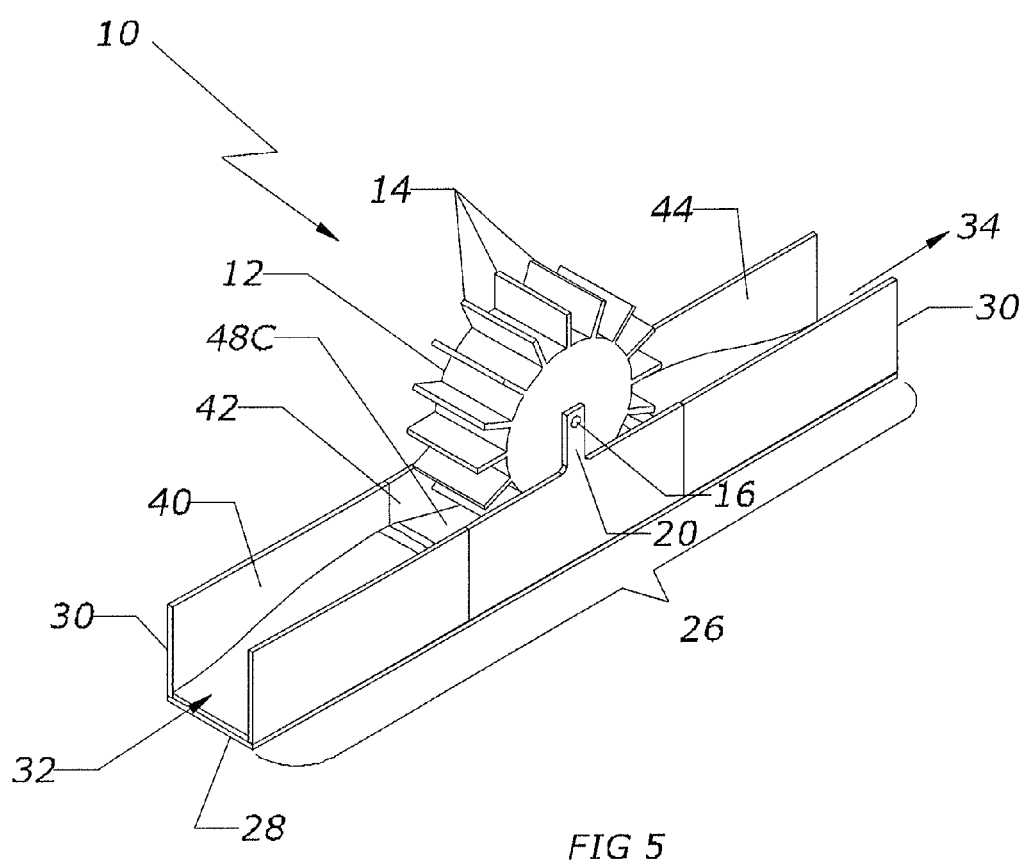
FIG. 5 is a perspective view of the paddle wheel electric generation device of the present invention illustrating the paddlewheel present in combination with a rising venturi floor and a concave paddlewheel/water contact region.
Figure 6:
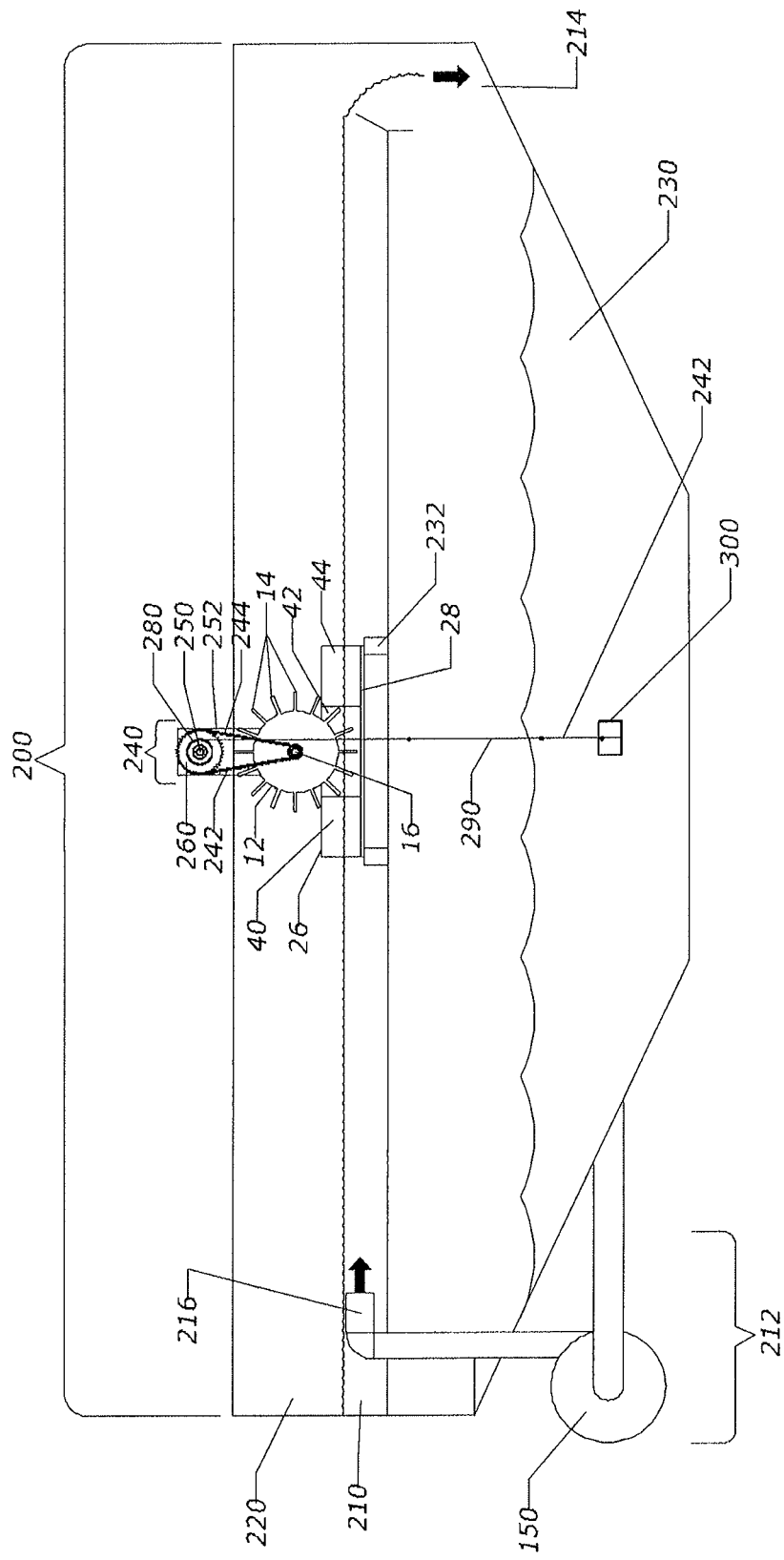
FIG. 6 is a cross-sectional view of the device of FIG. 1 rigged to permit a power generation measurement test.

FIG. 5 includes the same rising and falling slope configurations for the ingress and egress components 40, 44 as in FIG. 2. The paddlewheel/water contact component 42 includes a concave floor configuration 48B instead of a flat or concave floor, with the side walls 30 remaining straight and parallel.

Such curved floor and side wall additions permit noticeable water flow velocity increases, as was noticed when the inventive paddlewheel systems were incorporated within an analytical test protocol to measure the capability of power generation from the water flow velocity through the venturi and transferred to the target paddlewheel blades. This test protocol is outlined in FIGS. 6, 7, 8 and 9 (as well as 7A, 8A, and 9A), wherein the base systems are placed within a demonstration water flow channel 200 that includes a water source 210 as well as means to generate not only a unidirectional flow of the water source 150, but also means to increase the flow artificially. In this particular instance, this laboratory-scale water source channel was manufactured by Engineering Laboratories Design of Lake City, Minn. (Model #14). This testing device is itself a closed-end channel that feeds the water therethrough at one end 212 and collects the passed-through water at the other end 214. The device includes two chambers stacked one over the other, with the upper chamber 220 being the channel through which the water is passed, as well as the chamber into which the inventive paddlewheel system was placed. A lower chamber 230 is separated from the top chamber and it transports the collected water after passage through the channel back to the origination source to continue feeding and creating the water flow (i.e., recycles the used water) to further the test without having to add any water from an external source.

FIGS. 6 through 9 show solely a partial view of the upper chamber 220, with the paddlewheel system 10 placed therein. Thus, the width and length of the test device 200 exceeds that of the inventive venturi 26 in order to effectuate the desired flow of the water source 210 through both the test device 200 and the paddlewheel system 10 simultaneously. The venturi 26 is, in this instance, placed on blocks 232 in order to ensure the flow of water through the system 10 as well as under the venturi 26 and around the side walls 30 to best imitate a real-life system placed in an open water environment. Such a small-scale system further includes a measurement device to detect the amount of weight such a paddlewheel can lift upon engagement within this test device 200. Such a measurement thus provides a suitable indication of the amount of power available from the overall design and configuration of the paddlewheel system 10 and, furthermore, may also be used to extrapolate expected electrical power generation both at a laboratory-scale level as well as at an expanded large-scale level. The measuring device 240 (more closely seen in FIGS. 7A, 8A, and 9A) thus includes a gear 242 attached securely to the main shaft 16 which passes through the paddlewheel and which rotates at the same speed as the wheel when moving. To the gear is attached a chain 244 with openings complementary in size to the teeth of the main shaft gear. The chain extends upwardly to a second rotating shaft 250 that runs parallel to the main shaft 16 as well as the supporting transom 252 that is holding the paddlewheel itself in place within the venturi 26. This second shaft 250 also includes a gear 260 that is aligned and in contact with the chain in order to allow for further rotational movement in relation to the rotational speed of the paddlewheel (and thus the main shaft 16). This second shaft 250 thus runs to a point that is outside of the plane defined by the test device boundary in order to allow for a spool 280 to be attached thereto that itself may rotate in relation to the same base movement described above. This spool 280 includes a suitably high tension line 290 to hold up to 30 pounds of weight and that can do so while being raised in relation to the uptake permitted by the rotating spool 280. Lastly, attached to the bottom of the line 290 is a container 300 to which specified amounts of weight may be added in order to permit multiple measurement cycles of the inventive paddlewheel system to determine the amount of time such a rotating water-driven device may raise a certain amount of weight a set distance. In these tests, the results were measured for a lift distance of two feet with a base weight of 32 ounces, increased in increments of 11 or 22 ounces. From such a basic measurement, work, force, and power may be calculated and, subsequently, expected levels of potential electrical generation may be estimated as well, all through the capability of the paddlewheel to capture the hydrokinetic power of the flowing water through the venturi.

Figure 8:
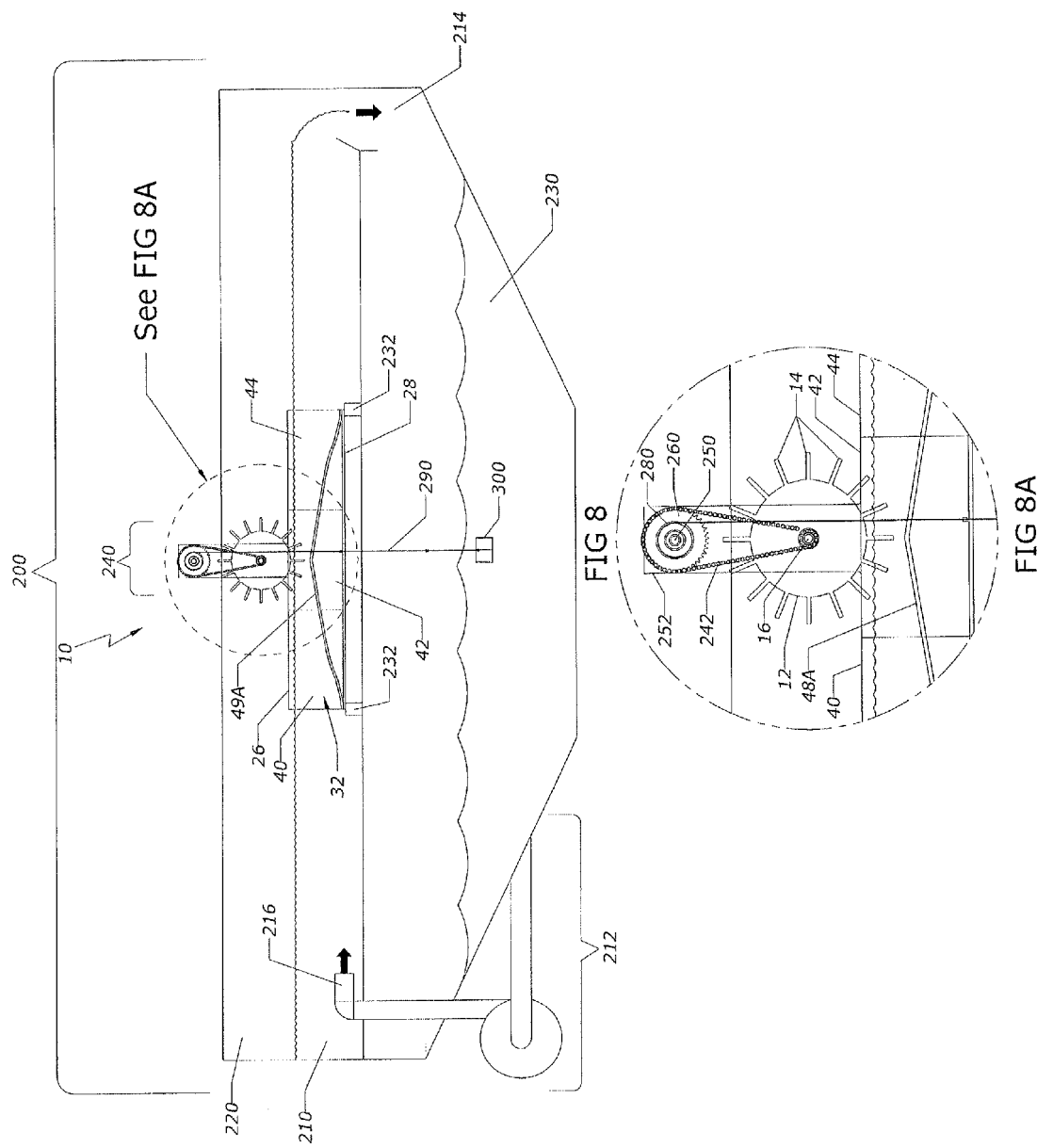
FIG. 8 is a cross-sectional view of the device of FIG. 4 rigged to permit a power generation measurement test.
Figure 9:
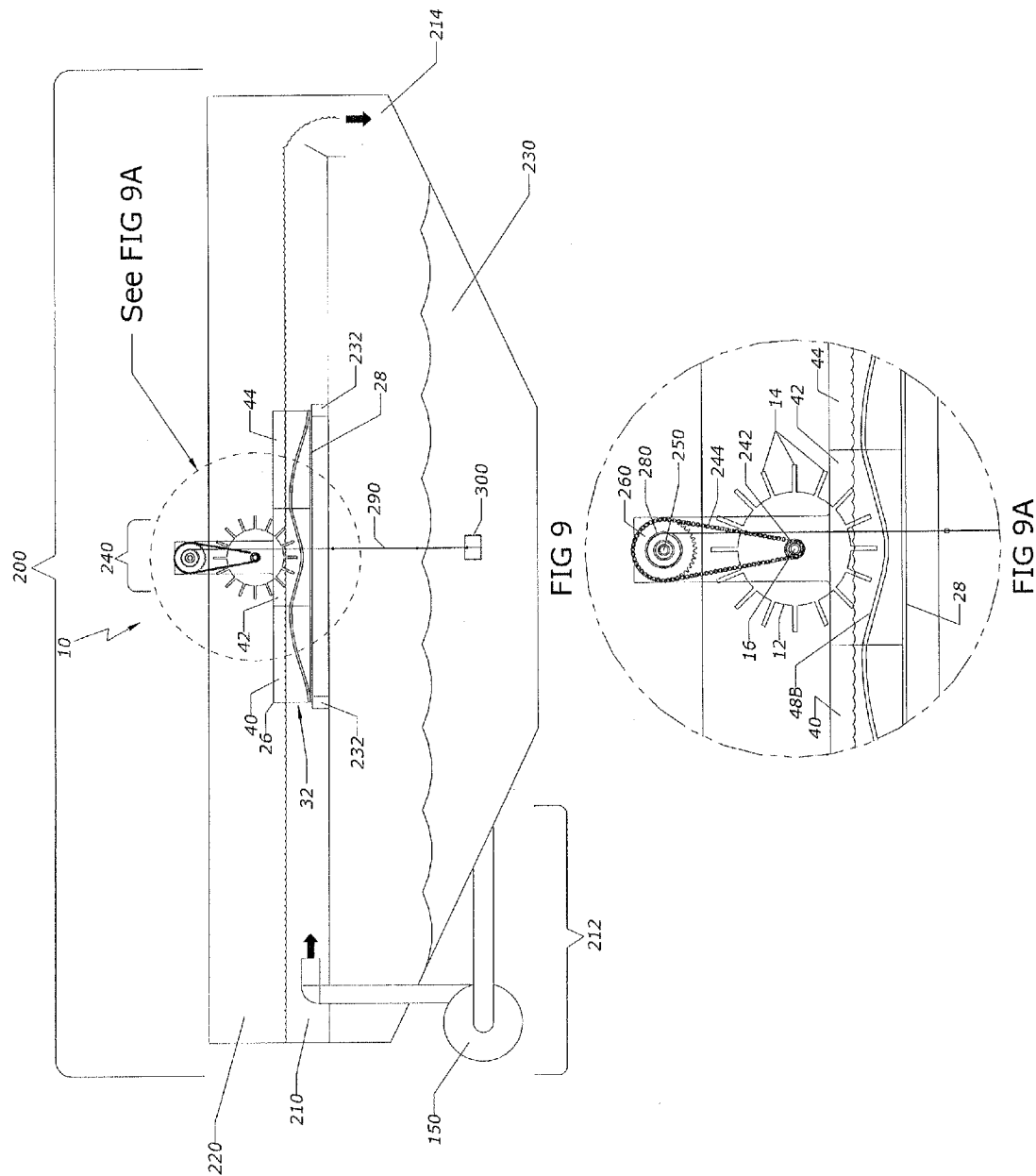
FIG. 9 is a cross-sectional view of the device of FIG. 5 rigged to permit a power generation measurement test.
Figure 10:
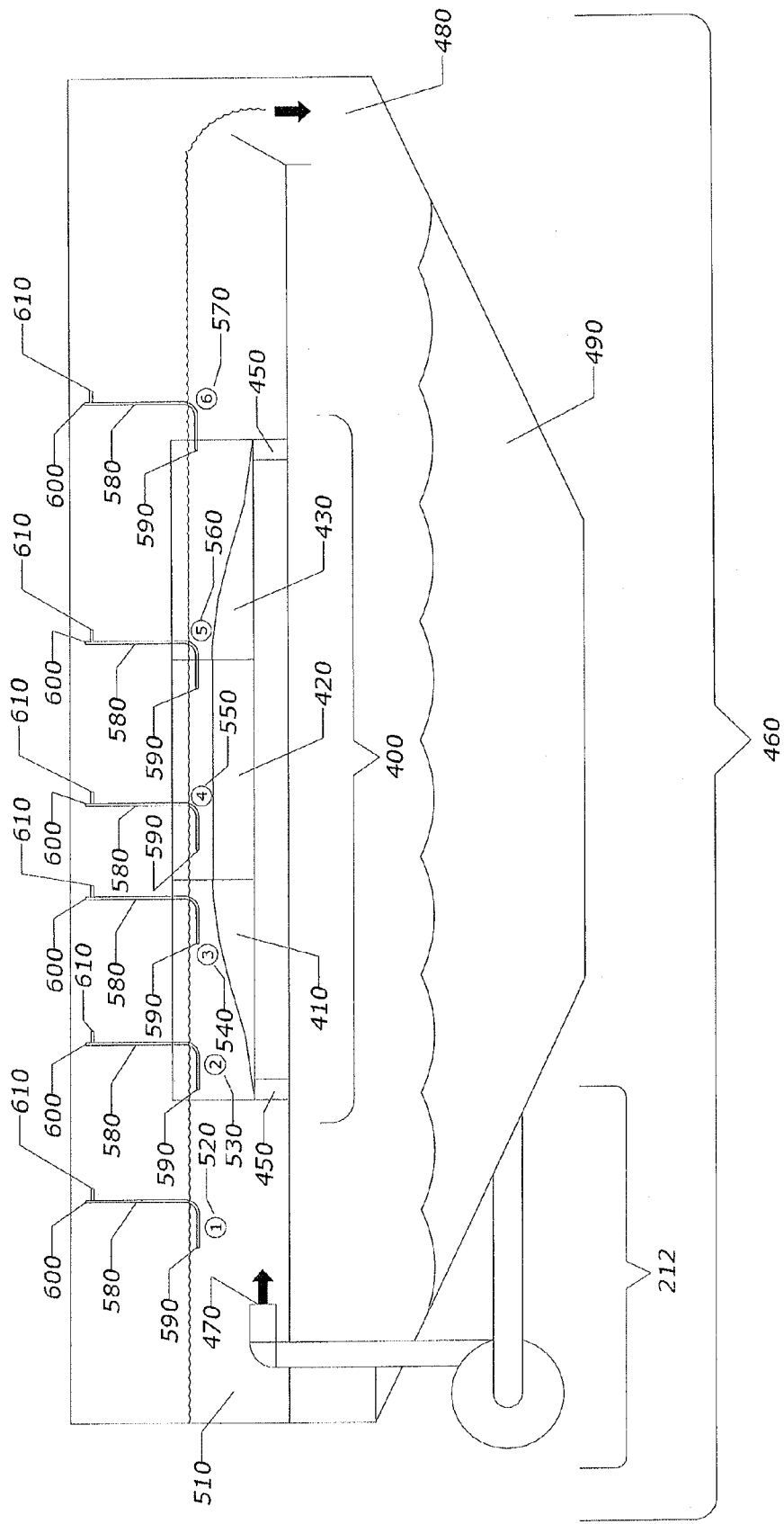
FIG. 10 is a cross-sectional view of a representation of a water velocity test protocol including the inventive venturi as provided in FIG. 2 to measure water pressure differential at discrete locations along the system.
Figure 11:
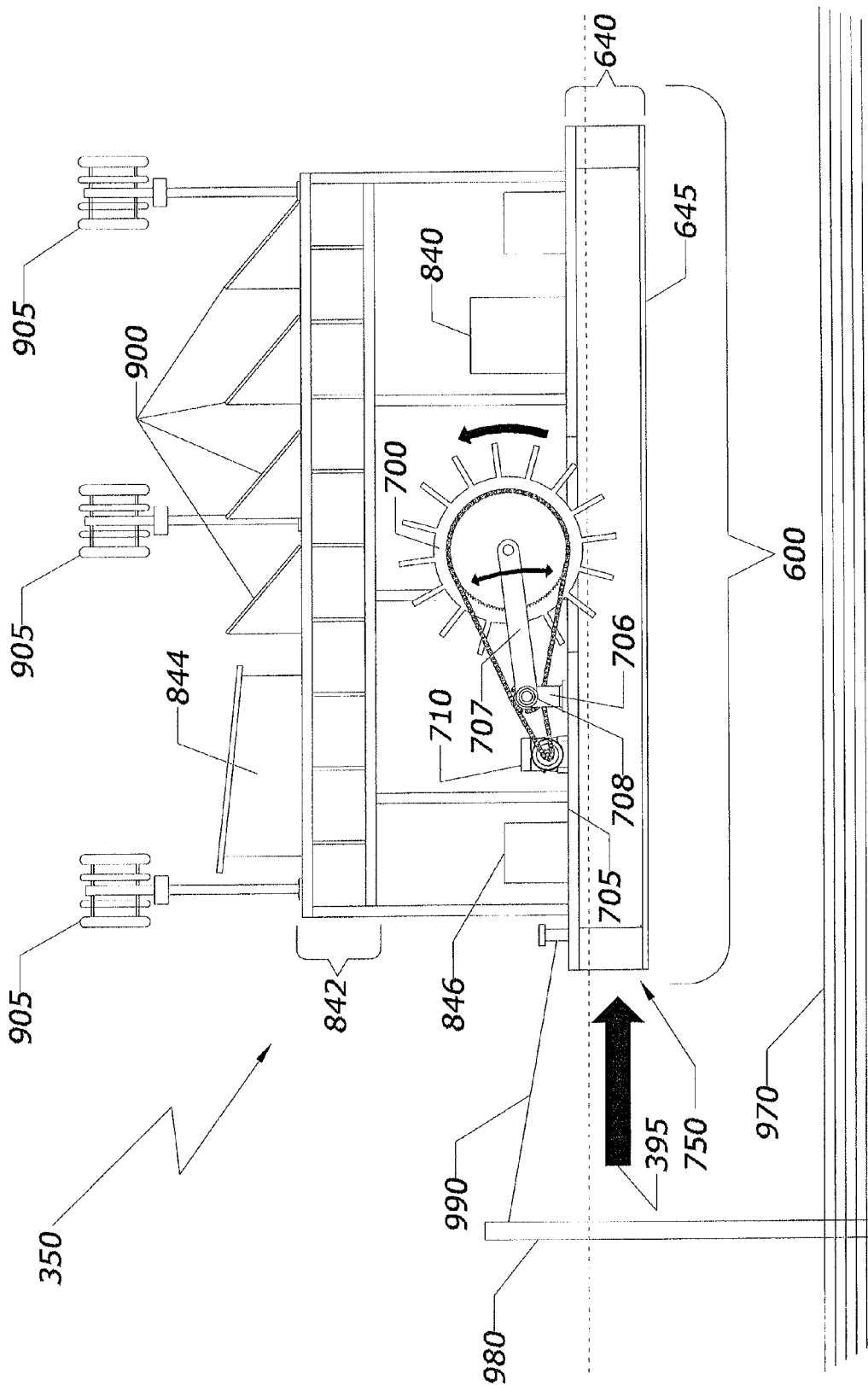
FIG. 11 perspective view of a floating barge including a large-scale paddlewheel system of the same base configuration as in FIG. 1.
Figure 12:
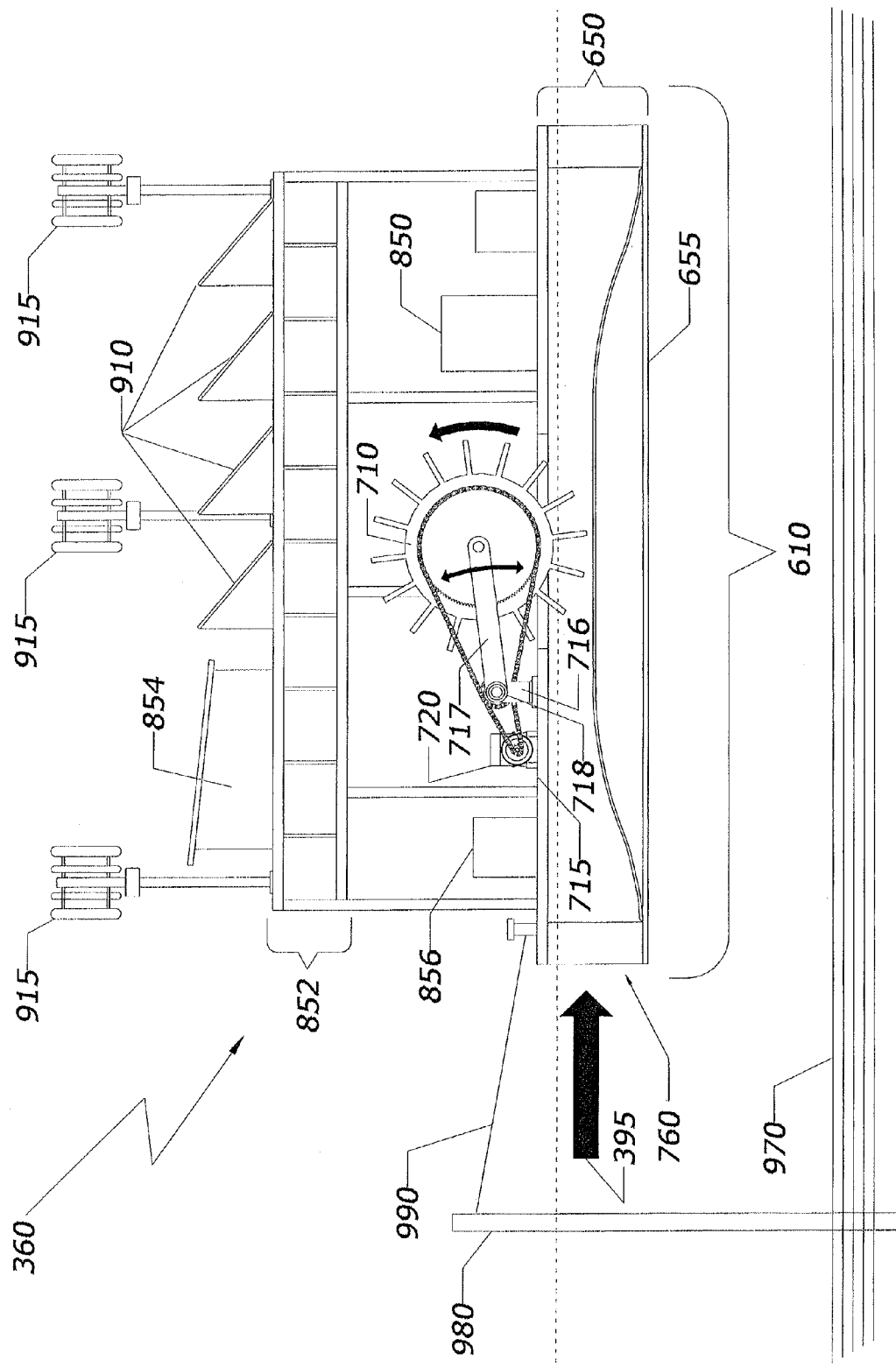
FIG. 12 is a perspective view of a floating barge including a large-scale paddlewheel system of the same base configuration as in FIG. 2.
Figure 13:
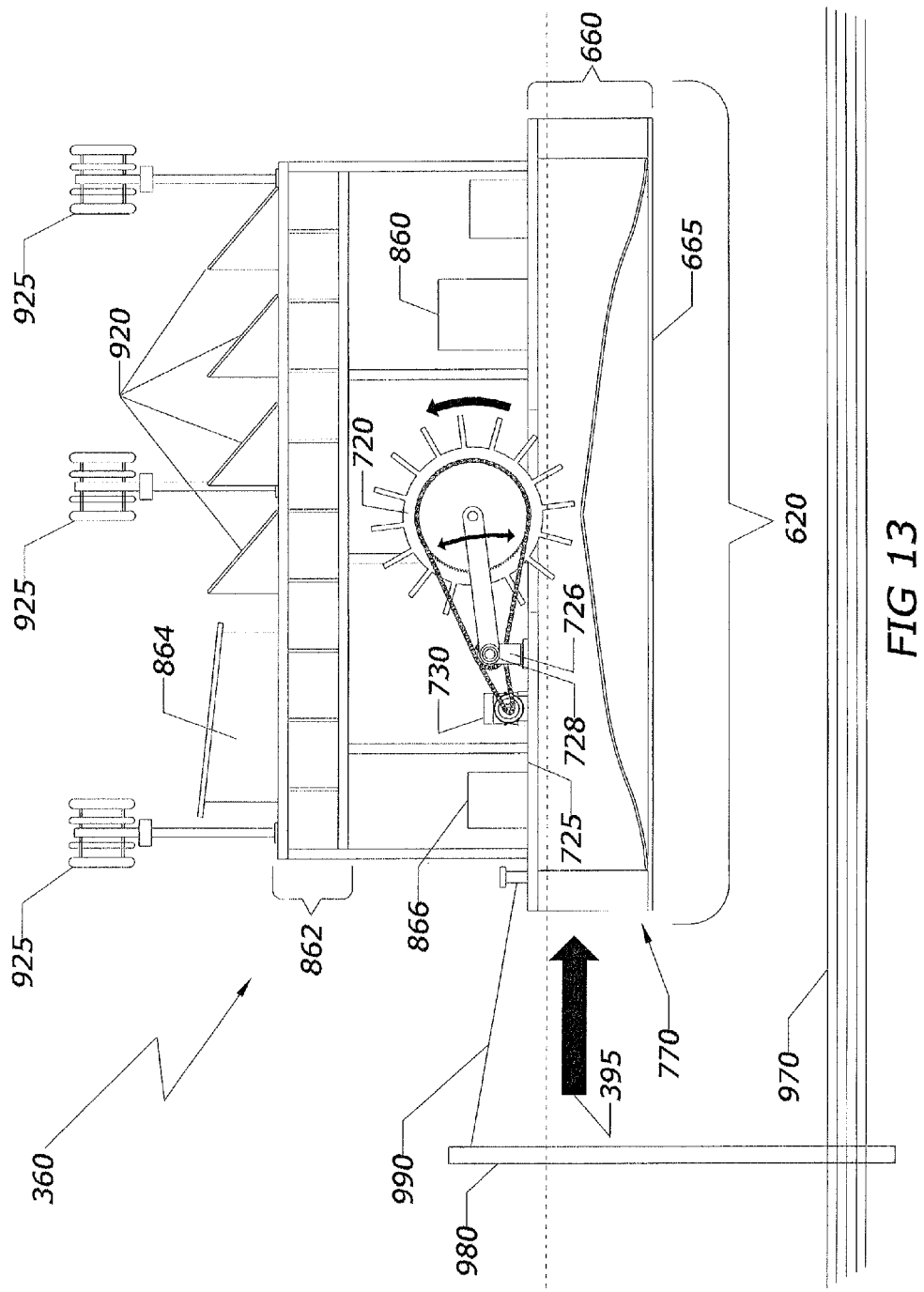
FIG. 13 is a perspective view of a floating barge including a large-scale paddlewheel system of the same base configuration as in FIG. 4.
Figure 14:
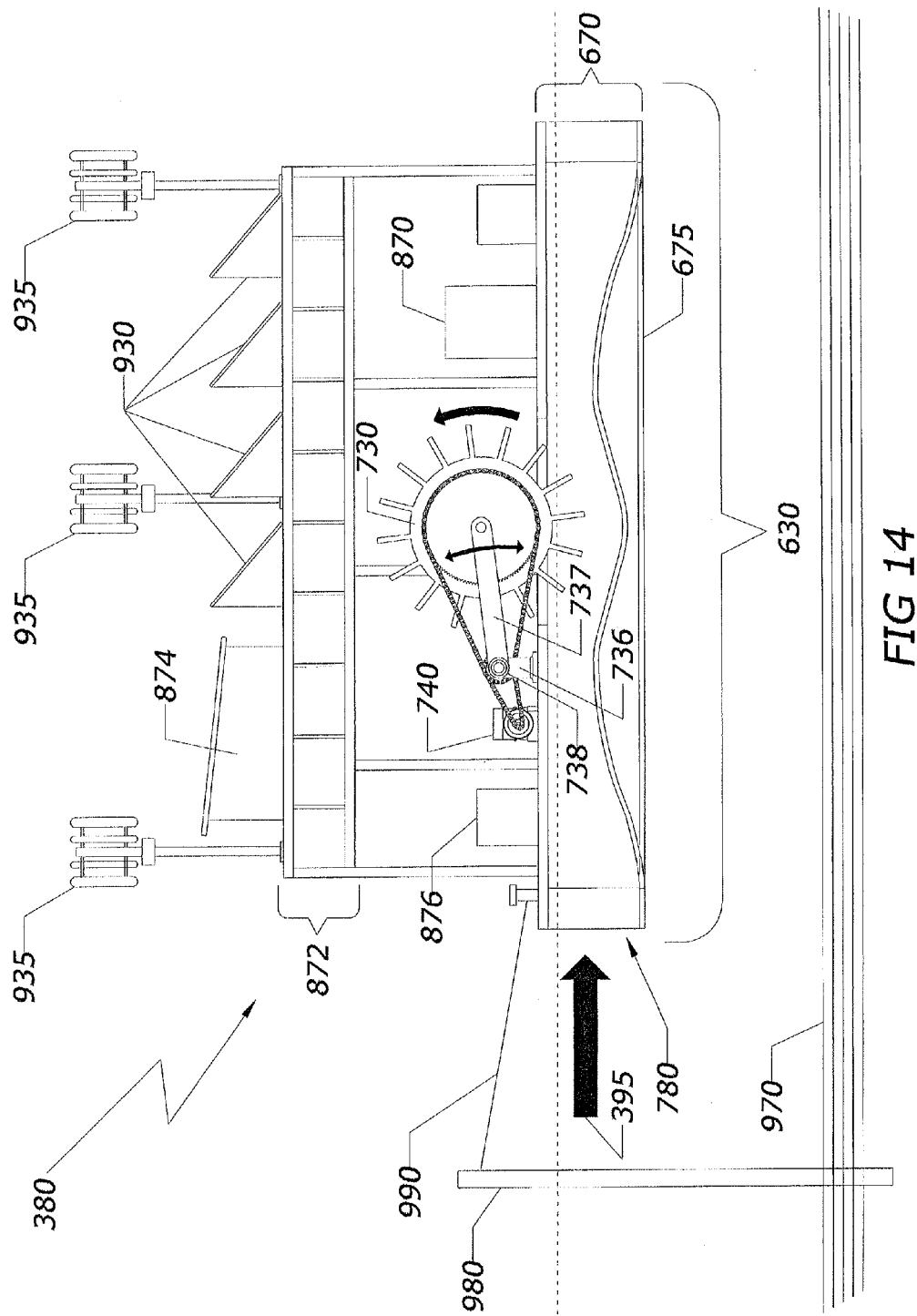
FIG. 14 is a perspective view of a floating barge including a large-scale paddlewheel system of the same base configuration as in FIG. 5.

Additionally, as depicted in FIG. 10, a test protocol was devised to measure the actual flow velocity of water as it passes through the inventive venturi 400 (and thus through the entire inventive paddlewheel system 10 of FIGS. 6-9, for instance). Increases in velocity would provide a proper indication of the capacity of such a device to generate power even in low water flow velocity conditions. Thus the venturi 400 with a rising and sloping ingress floor 410, level paddlewheel water contact region 420 and lowering and sloping egress floor 430 as well as sidewalls 440, was placed on blocks 450 within a water velocity generating device 460. Such a device delivered water flow in one direction 470 through the venturi 400 and out to a capture and return component 480. A reservoir 490 housed the water until a pump 500 was activated to deliver the water 510 as needed and at a set flow speed (here, roughly 0.5 miles per hour). Measurements were taken of the flow velocity of the water source at six different points 520, 530, 540, 550, 560, 570, through the utilization of a pitot tube 580 having a top pressure opening 590 and a bottom pressure opening 600. These points were located prior to contacting the venturi opening 520, in the middle of the rise of the ingress component of the venturi 530, once the water enters the paddlewheel/water contact section 540, the mid-point of the paddlewheel/water contact section 550, at the point the paddlewheel/water contact section meets with the discharge component 560, and in the middle of the descent in the discharge component 570. Each measurement was taken at substantially the middle between the two side walls of the venturi in each instance, as well. The flow meter (pitot tube) 580 device was actually a pressure comparison estimator that provided a ratio between the total pressure generated by the water flow at a specific location versus the static pressure of the water flow in the water source itself. Any increase in pressure measured within the venturi 400 would indicate an increase in water flow velocity at that point in relation to the water source flow velocity. The ratio of such pressure differences thus would indicate the ratio of the water speed differences in a linear fashion. These results are provided below, as well.

In any event, as shown in FIGS. 1-5, at least, the capability of such a inventive device 10 to generate levels of power in relation solely to the flow velocity of a water source was found to be far superior with this inventive venturi design than for open-water, or, at least, open-water paddlewheel power generation comparisons. Coupled with the accessible design to allow for a person to easily view and/or reach the paddlewheel during operation, if necessary, utilization of such an open-channel venturi, rather than a tube (closed top and bottom)(again, such a closed top configuration would prevent the surprisingly effective capability of water flow velocity increases since it appears that gravity and/or atmospheric pressure, as well as surface tension, also contributes to such an unforeseen benefit) arrangement or, again, an open-water device, the overarching capability in terms of beneficial physical properties as well as ease in maintenance, at least, provides a far superior floating apparatus for water-based power generation than has been provided in the past.

Resultant Physical and Mechanical Properties

As noted above, initial testing at laboratory scale provides effectively high water flow velocity through the inventive venturi paddlewheel system apparatus. Surprisingly, the utilization of a properly configured parabolic curve within the venturi floor accords increases in discrete water flow velocity measurements that were unforeseen and that, ultimately, lent themselves to creating far higher rotational speed and power than was first hypothesized. To measure such properties, a pitot device was put together to provide, comparative pressure readings within specific regions of the venturi/paddlewheel system while water flowed through at a standard rate. The pitot device thus allowed for pressure differences within the water flow (again, set at a specific location) with the pressure measured within the external environment (i.e. ambient pressure). The pressure differential measured prior to entrance within the venturi thus provided a basis for all other measurements (since it concerned the specific water flow velocity as provided before ingress). The ratio of pressures would then be compared at selected areas within the venturi (as noted in FIG. 10) as well as past the egress point to determine the water flow velocity measurements appropriately. The resultant measurements are provided in tabulated form in TABLE 1, below, with the measurement locations as labeled in FIG. 10.

TABLE 1

Water Flow Velocity Measurements

| Run | Position | Pressure (N) Upper | Pressure (N) Lower | Pressure (N) Change | Avg. Change | Calculated Velocity (mph) |
|---|---|---|---|---|---|---|
| 1 | 1 | 2.02 | 1.92 | 0.10 | — | — |
| 2 | 1 | 2.05 | 1.95 | 0.10 | — | — |
| 3 | 1 | 2.02 | 1.92 | 0.10 | — | — |
| 4 | 1 | 2.02 | 1.92 | 0.10 | — | — |
| 5 | 1 | 2.03 | 1.93 | 0.10 | 0.10 | 0.49 |
| 1 | 2 | 2.02 | 1.92 | 0.10 | — | — |
| 2 | 2 | 2.10 | 1.91 | 0.19 | — | — |
| 3 | 2 | 2.10 | 1.93 | 0.08 | — | — |
| 4 | 2 | 2.05 | 1.82 | 0.23 | — | — |
| 5 | 2 | 2.05 | 1.92 | 0.13 | 0.15 | 0.61 |
| 1 | 3 | 2.04 | 1.45 | 0.59 | — | — |
| 2 | 3 | 2.04 | 1.48 | 0.60 | — | — |
| 3 | 3 | 2.03 | 1.46 | 0.57 | — | — |
| 4 | 3 | 2.05 | 1.45 | 0.60 | — | — |
| 5 | 3 | 2.04 | 1.46 | 0.58 | 0.59 | 1.21 |
| 1 | 4 | 2.04 | 1.50 | 0.54 | — | — |
| 2 | 4 | 2.02 | 1.50 | 0.52 | — | — |
| 3 | 4 | 2.03 | 1.47 | 0.56 | — | — |
| 4 | 4 | 2.03 | 1.45 | 0.58 | — | — |
| 5 | 4 | 2.03 | 1.48 | 0.55 | 0.65 | 1.18 |
| 1 | 5 | 2.02 | 1.45 | 0.57 | — | — |
| 2 | 5 | 2.00 | 1.40 | 0.60 | — | — |
| 3 | 5 | 2.00 | 1.46 | 0.54 | — | — |
| 4 | 5 | 2.00 | 1.40 | 0.60 | — | — |
| 5 | 5 | 2.01 | 1.43 | 0.58 | 0.58 | 1.20 |
| 1 | 6 | 2.00 | 1.40 | 0.60 | — | — |
| 2 | 6 | 2.00 | 1.48 | 0.52 | — | — |
| 3 | 6 | 2.00 | 1.45 | 0.55 | — | — |
| 4 | 6 | 2.01 | 1.47 | 0.54 | — | — |
| 5 | 6 | 2.01 | 1.45 | 0.56 | 0.55 | 1.17 |

These readings show that the water flow velocities within the confines of the venturi are well above those measured for the water source as provided prior to ingress therein. Such results are highly unexpected as the capture and transport through the venturi, particularly upon egress, and specifically with an open-top design in place, would not typically generate such huge increases in speed. Generally, such readings are limited to designs that force water through a tube (in other words, confined on all sides, thus driving the water from a high pressure area through to a lower pressure one, thus increasing its speed). Prior water-based power generators have been shown with such top and bottom enclosures that left the rotation of the wheel to the mercy of the water, without any access for upkeep or other reason, not to mention the difficulties inherent with wheels that have no dispersal points to prevent clogging or other potential problem due to the presence of undesirable materials. In any event, these measurements show over 100% velocity increases throughout the venturi. At a water flow velocity of 0.5 miles per hour, the speed increases to a maximum (at least in terms of selected locations measured) of 1.2. Thus, it was theorized that such an impressive and unexpected water flow velocity increase could impart power generation capabilities for the same base 1.2 mile per hour water speed that were unprecedented.

Therefore, the paddlewheel system was rigged as described in FIGS. 6, 7, 8, and 9, above, to permit weight measurements in terms of generated force for lift provided solely through the transfer of energy from the water passing through the inventive venturi to the rotation of the paddlewheel itself. As noted above, for the laboratory measurements, a spool with properly gauged line was provided to allow for a weight container to be placed below the test water tank (and thus, external to such a tank, as well). The spool was attached to rotating axle that turned through generation of a chain moving in relation to the rotation of the paddlewheel itself. Multiple runs were made with increasing weight placed within the lifting container in order to show the capability of the rotating wheel to generate power to lift such weights a specific linear height. The overall speed for the container to rise such a vertical, linear distance, thus provided a measurement to then consider in terms of not just power generation capability, but, ultimately, electrical power generation capability through the water flow velocity increases provided by the inventive paddlewheel system.

The results are provided, in tabulated form, below, specifically for the paddlewheel/venturi configurations of FIGS. 7, 8, and 9, with the water flow velocity provided by the test device measured to be 0.5 miles per hour, in terms of actual power generation. As such, it is evident that these results show the highly unexpected benefits of including a closed-bottom artificial channel to provide a highly efficient, clean power source. The paddlewheel outer diameter in this laboratory setting was 22.5 inches (1.875 feet); the take-up spool radius was 0.8125 inches (0.068 feet). Thus, with a lift distance for the weight of 2 feet, the revolution number of the spool was 4.701 (or 29.538 radians). The systems of FIGS. 7, 8, and 9 provided the following results:

TABLE 2

Figure 7:
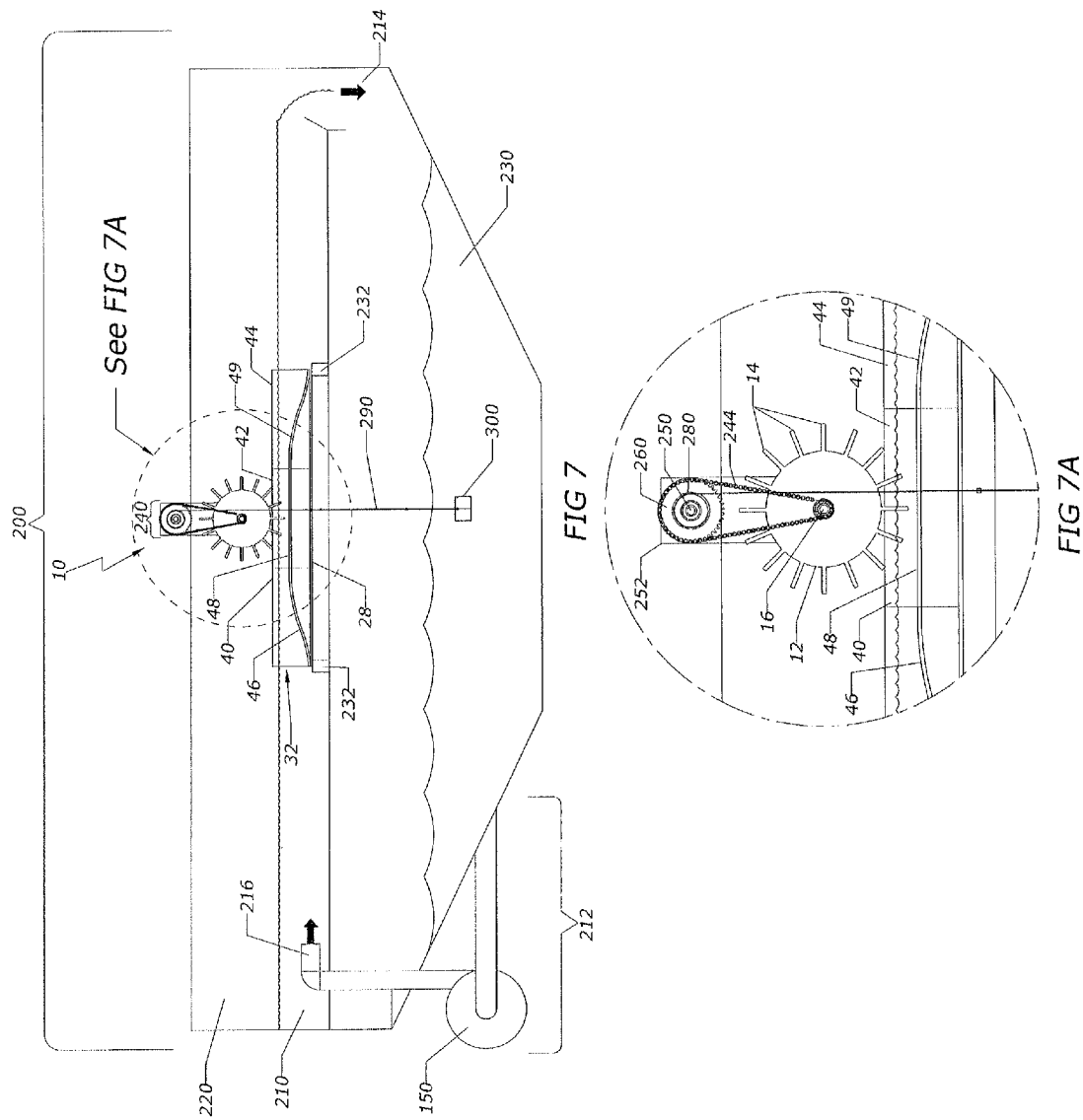
FIG. 7 is a cross-sectional view of the device of FIG. 2 rigged to permit a power generation measurement test.

Power Generation Calculations for FIG. 7 System Configuration

| Weight (oz) | Time (s) | | | | spool omega (rad/s) | spool torque (ft-lb) | Power (ft-lb/s) | Power (watts) |
| --- | --- | --- | --- | --- | --- | --- | --- | --- |
| | Run 1 | Run 2 | Run 3 | Avg. | | | | |
| 32 | 80.90 | 80.01 | 80.90 | 80.60 | 0.366 | 0.135 | 0.050 | 0.067 |
| 54 | 83.30 | 84.10 | 84.20 | 83.87 | 0.352 | 0.203 | 0.072 | 0.097 |
| 76 | 87.80 | 87.10 | 87.30 | 87.40 | 0.338 | 0.271 | 0.092 | 0.124 |
| 98 | 91.03 | 91.47 | 90.90 | 91.13 | 0.324 | 0.339 | 0.110 | 0.149 |
| 110 | 95.60 | 95.00 | 94.70 | 95.10 | 0.311 | 0.406 | 0.126 | 0.171 |
| 132 | 97.90 | 99.30 | 99.70 | 98.97 | 0.298 | 0.474 | 0.141 | 0.192 |
| 154 | 102.47 | 103.60 | 102.60 | 102.89 | 0.287 | 0.542 | 0.156 | 0.211 |
| 170 | 109.50 | 109.10 | 108.40 | 109.00 | 0.271 | 0.609 | 0.165 | 0.224 |
| 186 | 113.10 | 114.90 | 114.90 | 114.30 | 0.258 | 0.677 | 0.175 | 0.237 |
| 202 | 122.00 | 121.20 | 120.70 | 121.30 | 0.244 | 0.745 | 0.181 | 0.246 |
| 218 | 123.80 | 124.20 | 124.30 | 124.10 | 0.238 | 0.813 | 0.193 | 0.262 |
| 234 | 132.30 | 132.00 | 131.40 | 131.90 | 0.224 | 0.880 | 0.197 | 0.267 |
| 250 | 137.30 | 137.40 | 137.10 | 137.27 | 0.215 | 0.948 | 0.204 | 0.277 |
| 266 | 144.30 | 143.70 | 145.10 | 144.37 | 0.205 | 1.016 | 0.208 | 0.282 |
| 282 | 158.70 | 157.30 | 156.80 | 157.60 | 0.187 | 1.083 | 0.203 | 0.275 |
| 298 | 164.50 | 162.20 | 163.20 | 163.30 | 0.181 | 1.151 | 0.208 | 0.282 |
| 314 | 178.10 | 177.50 | 177.90 | 177.83 | 0.166 | 1.219 | 0.202 | 0.275 |
| 330 | 187.80 | 189.30 | 190.00 | 189.03 | 0.156 | 1.286 | 0.201 | 0.273 |
| 346 | 213.10 | 210.50 | 209.50 | 211.03 | 0.140 | 1.354 | 0.190 | 0.257 |
| 362 | 243.40 | — | — | 243.90 | 0.121 | 1.422 | 0.173 | 0.234 |

TABLE 3

Power Generation Calculations for FIG. 8 System Configuration

| Weight (oz) | Time (s) | | | | spool omega (rad/s) | spool torque (ft-lb) | Power (ft-lb/s) | Power (watts) |
| --- | --- | --- | --- | --- | --- | --- | --- | --- |
| | Run 1 | Run 2 | Run 3 | Avg. | | | | |
| 32 | 65.10 | 65.90 | 65.80 | 65.60 | 0.450 | 0.135 | 0.061 | 0.083 |
| 54 | 69.80 | 69.60 | 69.40 | 69.60 | 0.424 | 0.203 | 0.086 | 0.117 |
| 76 | 73.70 | 73.00 | 72.70 | 73.13 | 0.404 | 0.271 | 0.109 | 0.148 |
| 98 | 77.00 | 76.90 | 76.90 | 76.93 | 0.384 | 0.339 | 0.130 | 0.176 |
| 110 | 80.60 | 81.90 | 82.30 | 81.60 | 0.362 | 0.406 | 0.147 | 0.199 |
| 132 | 85.10 | 85.70 | 85.50 | 85.43 | 0.346 | 0.474 | 0.164 | 0.222 |
| 154 | 90.90 | 90.40 | 90.10 | 90.47 | 0.327 | 0.542 | 0.177 | 0.240 |
| 170 | 96.00 | 93.60 | 94.70 | 94.77 | 0.312 | 0.609 | 0.190 | 0.258 |
| 186 | 99.20 | 99.40 | 99.00 | 99.20 | 0.298 | 0.677 | 0.202 | 0.273 |
| 202 | 104.00 | 103.60 | 104.30 | 103.97 | 0.284 | 0.745 | 0.212 | 0.287 |
| 218 | 109.50 | 110.50 | 109.50 | 109.83 | 0.269 | 0.813 | 0.219 | 0.296 |
| 234 | 116.80 | 117.60 | 117.50 | 117.30 | 0.252 | 0.880 | 0.222 | 0.301 |
| 250 | 127.30 | 126.70 | 126.00 | 127.00 | 0.233 | 0.948 | 0.220 | 0.299 |
| 266 | 133.80 | 135.40 | 137.00 | 135.40 | 0.218 | 1.016 | 0.222 | 0.301 |
| 282 | 145.90 | 147.10 | 146.90 | 146.63 | 0.201 | 1.083 | 0.218 | 0.296 |

TABLE 4

Power Generation Calculations for FIG. 9 System Configuration

| Weight (oz) | Time (s) Run 1 | spool omega (rad/s) | spool torque (ft-lb) | Power (ft-lb/s) | Power (watts) |
|---|---|---|---|---|---|
| 16 | 95.20 | 0.310 | 0.068 | 0.021 | 0.028 |
| 24 | 98.00 | 0.301 | 0.102 | 0.031 | 0.042 |
| 32 | 100.00 | 0.295 | 0.135 | 0.040 | 0.054 |
| 40 | 102.30 | 0.289 | 0.169 | 0.049 | 0.066 |
| 48 | 104.30 | 0.283 | 0.203 | 0.058 | 0.078 |
| 56 | 108.30 | 0.273 | 0.237 | 0.065 | 0.088 |
| 64 | 111.40 | 0.265 | 0.271 | 0.072 | 0.097 |
| 72 | 115.70 | 0.255 | 0.305 | 0.078 | 0.106 |
| 80 | 119.30 | 0.248 | 0.339 | 0.084 | 0.114 |
| 88 | 123.60 | 0.239 | 0.372 | 0.089 | 0.121 |
| 96 | 133.20 | 0.222 | 0.406 | 0.090 | 0.122 |
| 104 | 134.80 | 0.219 | 0.440 | 0.096 | 0.131 |
| 112 | 140.80 | 0.210 | 0.474 | 0.099 | 0.135 |
| 120 | 144.40 | 0.205 | 0.508 | 0.104 | 0.141 |
| 128 | 148.70 | 0.199 | 0.542 | 0.108 | 0.146 |
| 136 | 158.40 | 0.186 | 0.576 | 0.107 | 0.146 |
| 144 | 163.00 | 0.181 | 0.609 | 0.110 | 0.150 |
| 152 | 171.20 | 0.173 | 0.643 | 0.111 | 0.151 |
| 160 | 177.60 | 0.166 | 0.677 | 0.113 | 0.153 |
| 168 | 192.40 | 0.154 | 0.711 | 0.109 | 0.148 |
| 176 | 198.60 | 0.149 | 0.745 | 0.111 | 0.150 |
| 184 | 210.30 | 0.140 | 0.779 | 0.109 | 0.148 |
| 192 | 225.90 | 0.131 | 0.813 | 0.106 | 0.144 |
| 200 | 239.20 | 0.123 | 0.846 | 0.105 | 0.142 |
| 208 | 256.50 | 0.115 | 0.880 | 0.101 | 0.137 |
| 216 | 262.70 | 0.112 | 0.914 | 0.103 | 0.139 |
| 224 | 253.80 | 0.116 | 0.948 | 0.110 | 0.150 |

Figure 15:
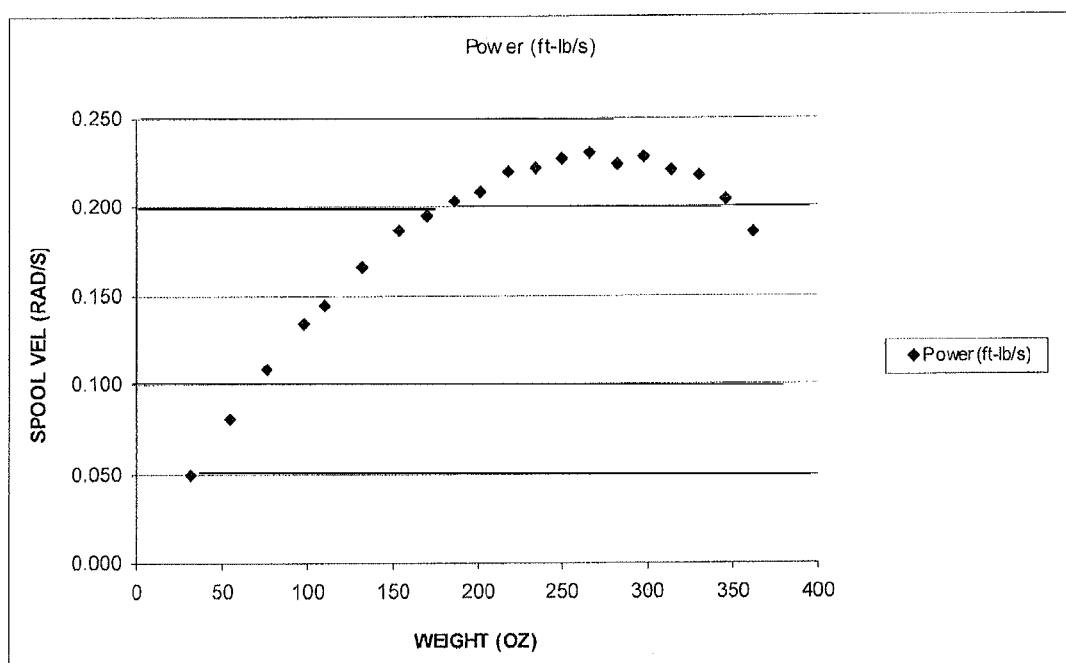
FIG. 15 is a graphical representation of the power capability of the device as provided in FIG. 2.
Figure 16:
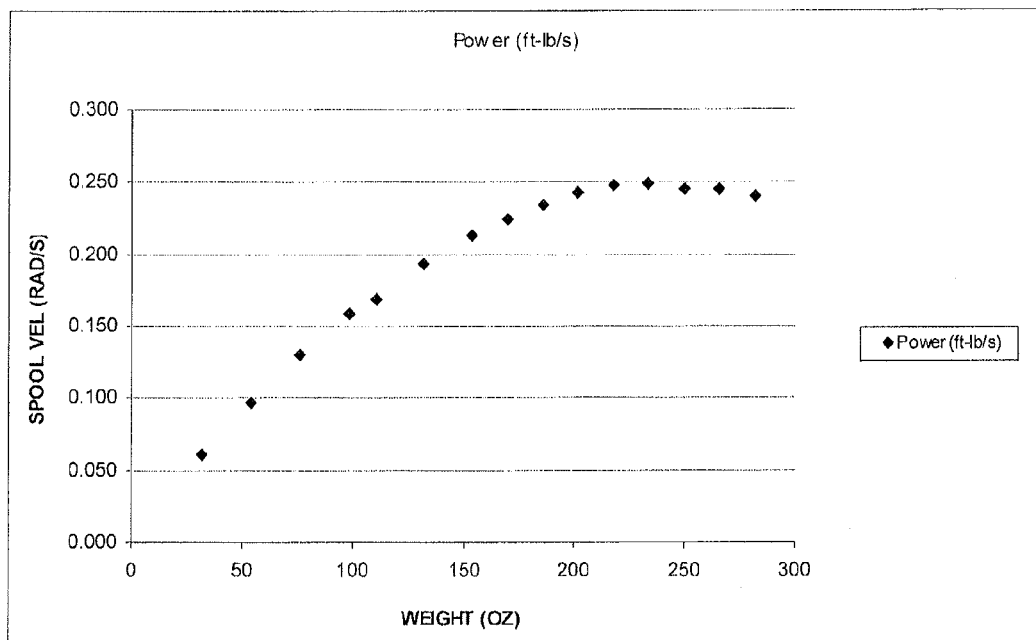
FIG. 16 is a graphical representation of the power capability of the device as provided in FIG. 4.
Figure 17:
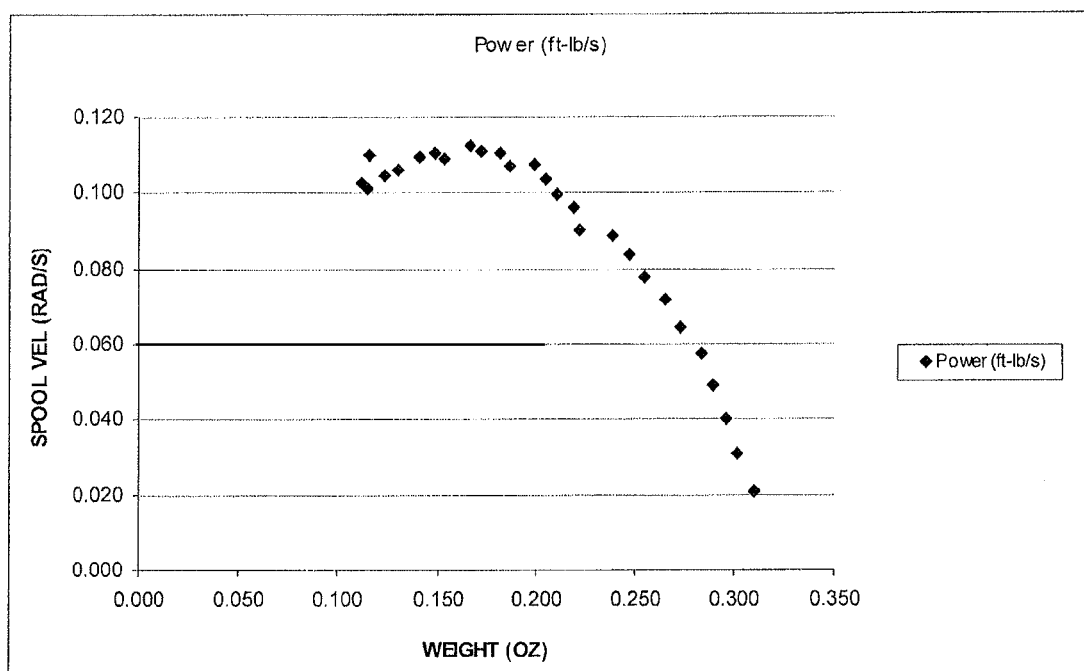
FIG. 17 is a graphical representation of the power capability of the device as provided in FIG. 5.

Such tabulated results are provided in graphical form within FIGS. 15, 16, and 17, thus showing the optimum beneficial power generation for each venturi configuration. Surprisingly, the convex floor shape within the paddlewheel/water contact region provides a significantly higher power generation capability (noticeably higher than that attained through the rising ingress and level paddlewheel/water contact portion, and significantly higher than that for the concave trough arrangement), thus further providing an unexpectedly good result as it pertains to the modification of the water flow level through the entire system in terms of height of the floor through which the water is transported. In actuality, the measurements show that a flat configuration venturi provides a 22% improvement in power generation over that of the concave shape, while the convex shape provides an 8% improvement over such measurements for the flat type. Thus, providing a sloped rise to a second incline appears to generate much higher water flow velocity, coupled with the pressure provided by the venturi floor, the side walls, and, importantly, surface pressure, such flow velocity contributes much higher force than attainable with a level floor venturi. Additionally, the configuration of the paddlewheel, being vertically aligned perpendicular to the venturi side walls themselves allows for reduced turbulence and greater capture of the force applied by the increased velocity water source. Were, for example, the wheel to be horizontally placed, the blades of the wheel would create significant turbulence that would most likely reduce the overall rotational speed of the wheel. As well, the ability to actually access the wheel itself during operation through the vertical alignment allows for greater reliability as removal of any impediments, or adjustment of the axle, as just some possible benefits, would not be easily achieved without the vertical and open configuration now required.

From these measurements, it is evident that the water flow velocity increases accord a highly effective and, more importantly, a highly efficient method of generating power through the utilization of a closed-bottom, open-top venturi system with a configured floor design and a properly aligned paddlewheel therein. Conversion of these laboratory level readings to real-world electrical power estimates are provided below to further show the impressive and, again, highly unexpected benefits such a paddlewheel system provides to harness the power of moving water sources, regardless of the current velocity.

Surprisingly, however, there has never been provided an effective dimensional analysis of paddlewheel performance pertaining to similitude between lab-sized equipment and predicted capabilities of large-scale apparatus. As such, it was important first to best determine a scheme within which to provide reliable estimates of such dimensional comparisons.

Considering, first, that a traditional paddlewheel is utilized within a system that requires partial submersion in a gravity-driven flowing fluid. Such a device may thus initially be considered in terms of well-known dimensionless models utilizing axial-flow and centrifugal-flow turbomachinery. Such devices conform to specific coefficients in terms of proper modeling comparisons, with equations calculating dimensionless results defined for each as:

$$\text{Flow Coefficient } \phi = \frac{Q}{ND^3}$$

$$\text{Head Coefficient } \psi = \frac{gH}{N^2 D^2} = \frac{\Delta p}{\rho N^2 D^2}$$

$$\text{Power Coefficient } \xi = \frac{P}{\rho N^3 D^5} \text{ or } \eta$$

with the following definitions in place:
D=wheel diameter [L]
gH=head [$L^2/T^2$]
h=paddle height [L]
N=rotational speed [1/T]
P=power [FL/T]
Q=flow rate [$L^3$]
V=approach velocity [L/T]
w=wheel width [L]
z=wheel submergence depth [L]
η=efficiency
ρ=density[$FT^2/L^4$]
μ=dynamics viscosity [$FT/L^2$]

Typical turbomachinery comparisons are relatively straightforward since the fluid flow measurements (the Reynolds number) are so large that useful dynamic similitude between model and prototype can be achieved without matching the values for a dimensionless parameter (the coefficients).

Unfortunately, paddlewheels do not fit well into this overall consideration, primarily because of the lack of a well-defined inlet or outlet. In essence, if the boundary of the device is defined by a cylinder bounded by the faces and periphery of the subject wheel, fluid flow enters and leaves in neither a radial or axial direction. Thus, a paddlewheel will be a tangential flow machine as a consequence. In that situation, the horizontal projection of the submerged portion of the paddlewheel onto a vertical surface upstream thereto is considered to be the device's "inlet," and a similar projection downstream is the outlet. The cross sectional area of the paddlewheel is thus normal to the fluid flow and is the product of the wheel width and submergence depth.

Examining the variables in the dimensionless parameters noted above, then, it is seen that the rotational speed N, the machine diameter D, and the fluid density ρ, within the specific system including the paddlewheel are all related thereto.

The major geometric features of the model and prototype are then related by requiring geometric similitude:

$$\frac{D_2}{D_1} = \frac{w_2}{w_1} = \frac{h_2}{h_1} = \frac{z_2}{z_1} = S = \text{Scale Factor}$$

As well, the volume flow rate of the fluid through the paddlewheel device machine is then related to the approach velocity of the flow by:

$$Q = VA = Vwz$$

Thus, in order to ensure reliable dimensional modeling in order to predict prototype power production from model performance, thus ensuring that $$\phi_1 = \phi_2 \text{ and } \psi_1 = \psi_2$$

produces dynamic similitude (utilizing the coefficients defined above) and, as well, $$\xi_1 = \xi_2,$$

a clear and usable definition for the Head Coefficient is required for the paddlewheel device itself. Unlike a centrifugal pump, there is no useful pressure change to be measured. Unlike a traditional hydrodynamic turbine or waterwheel driven by flow between two reservoirs at different elevations, there is no easily identified difference in potential energy (head). Two lines of thought lead to the same result. If the Head Coefficient is representative of the driving potential, (also referred to as the across-variable in system dynamics), then the paddlewheel is driven by the kinetic energy in the flow ($\frac{1}{2}V^2$=kinetic energy per unit mass). The paddle wheel is therefore considered strictly a device for capturing hydrokinetic energy and producing mechanical energy as a result. From the perspective of describing an incompressible flow, the Bernoulli Equation provides a proper relationship between the pressure, kinetic energy, and potential energy.

$$\frac{p}{\rho} + \frac{1}{2}V^2 + gH = \Pi;$$

where $\Pi$ is a constant.

It is clear from the structure of the Bernoulli equation that each of the three left-hand-side terms must have the same dimensions. It is also clear from an understanding of the physics represented by the equation that any of the three terms can be viewed as a driving potential for the flow depending on its boundary conditions. Therefore; the appropriate definition of the Head Coefficient for a paddlewheel is:

$$\text{Head Coefficient } \psi = \frac{\frac{1}{2}V^2}{N^2 D^2}$$

From model testing, in addition to geometric dimensions, values for $V_1$ ($Q_1$), $N_1$, $D_1$, $\rho_1$ and $P_1$ are known (as shown in the TABLEs, below). For the prototype, selection of a Scale Factor determines a value for all prototype geometric dimensions. Assuming that both model and prototype are operated in a flow of water, the densities are equal. At first inspection, it would appear that the values for two parameters (V, N) in the prototype can be adjusted to produce the desired equality of the Flow and Head Coefficients, and therefore dynamic similitude. However, if the prototype is to be operated in a natural environment (e.g., river), it is unlikely that the approach velocity can be altered. It may therefore be difficult to produce dynamic similitude. The only remaining variable then that can be controlled to produce dynamic similitude is the rotational speed $N_2$.

Dynamic similitude requires equality of the Flow Coefficient in the model and prototype:

$$\phi_1 = \frac{Q_1}{N_1 D_1^2} = \frac{Q_2}{N_2 D_2^2} = \phi_2$$

$$\frac{V_1 w_1 z_1}{N_1 D_1^2} = \frac{V_2 w_2 z_2}{N_2 D_2^2}$$

$$N_2 = N_1 \left(\frac{V_2}{V_1}\right)\left(\frac{w_2}{w_1}\right)\left(\frac{z_2}{z_1}\right)\left(\frac{D_1}{D_2}\right)^2$$

$$N_2 = N_1 \left(\frac{V_2}{V_1}\right)(S)(S)\left(\frac{1}{S}\right)^2 = N_1 \left(\frac{V_2}{V_1}\right)\frac{1}{S}$$

Dynamic similitude also requires equality of the Head Coefficient.

$$\psi_1 = \frac{\frac{1}{2}\rho V_1^2}{N_1^2 D_1^2} = \frac{\frac{1}{2}\rho V_2^2}{N_2^2 D_2^2} = \psi_2$$

$$N_2^2 = N_1^2 \left(\frac{V_2^2}{V_1^2}\right)\left(\frac{D_1^2}{D_2^2}\right)$$

$$N_2 = N_1 \left(\frac{V_2}{V_1}\right)\left(\frac{1}{S}\right)$$

Therefore, dynamic similitude can be achieved with the adjustment of just one parameter, N, because the requirements of matching Head and Flow Coefficients have collapsed into a single criterion (Eg. Xx).

Equality of the Power Coefficient can then be used to predict the power that will be produced by the prototype.

$$\xi_1 = \frac{P_1}{\rho_1 N_1^3 D_1^5} = \frac{P_2}{\rho_2 N_2^3 D_2^5} = \xi_2$$

$$P_2 = P_1 \left(\frac{N_2}{N_1}\right)^3 \left(\frac{D_2}{D_1}\right)^5$$

$$P_2 = P_1 \left[\left(\frac{1}{S}\right)\left(\frac{V_2}{V_1}\right)\right]^3 (S)^5$$

$$P_2 = P_1 \left(\frac{V_2}{V_1}\right)^3 S^2$$

Therefore, if the rotational speed of the prototype is selected to produce dynamic similitude, the power produced by the prototype will be proportional to the square of the scale factor and the cube of the velocity ratio. Thus, the following was determined in terms of similitude between the prototype and the large-scale model through these comparisons.

In terms of kinetic energy calculations, a number of initial measurements were taken for the laboratory-scale system. The applied velocity ($V_{app}$) of the water flow was 0.71 ft/second, with the constant (P, or rho) indicating force applied per water volume to be 62.4 lb-m/ft³ (also referred to as the power coefficient for the overall system). The area of the inlet ($A_{inlet}$) for contact was 0.25 ft². From these base values, kinetic energy was then calculated through the following equation:

$$KE = [rho(\text{lb-m/ft}^3)][V_{app}(\text{ft/s})][A_{inlet}(\text{ft}^2)][\frac{1}{2}*V_{app}^2(\text{ft}^2/\text{s}^2)](1/32.2)$$

From the measurements provided above in TABLE 2, the maximum kinetic energy in the available water flow was measured to be 0.087 ft-lb/s, and the maximum amount of power was calculated to be 0.190 ft-lb/s. Extrapolating for a large-scale floating (or stationary) device, with, for example, a $V_{app}$ of 10.56 ft/s, a rho measurement the same as above, and an $A_{inlet}$ of 1794 ft$^2$, the kinetic energy measurements using the same equation were 2,046,977 ft-lb/s for the water flow and 2,776,445 watts of available power (with a maximum predicted power of 558,559 watts). This is performed through the following equation, incorporating the measurements of the test device herein, in order to extrapolate as reliable as data as possible for a large-scale (22 times this laboratory-scale) paddlewheel system. Each increase in weight from TABLE 2 was extrapolated accordingly to make a proper estimation as to the power available from a large-scale paddlewheel system (about 22 times of the laboratory-scale device). Using the power equation, above, these measurements were calculated to be, as follows (with PC the Power Coefficient as described above):

TABLE 5

Large-Scale Power Measurement Extrapolations (FIG. 7 Device)

| Weight (oz) | wheel ω (rad/s) | Velocity (tip) (ft/s) | λ Vel(tip)/ Vel(app) | PC | Barge Power (watts) |
|---|---|---|---|---|---|
| 32 | 1.466 | 1.374 | 1.940 | 0.00035 | 146,240 |
| 54 | 1.409 | 1.321 | 1.865 | 0.00064 | 237,178 |
| 76 | 1.352 | 1.267 | 1.790 | 0.00098 | 320,311 |
| 98 | 1.296 | 1.215 | 1.716 | 0.00137 | 396,113 |
| 110 | 1.242 | 1.165 | 1.645 | 0.00168 | 426,071 |
| 132 | 1.194 | 1.119 | 1.580 | 0.00218 | 491,310 |
| 154 | 1.148 | 1.077 | 1.520 | 0.00275 | 551,338 |
| 170 | 1.084 | 1.016 | 1.435 | 0.00341 | 574,503 |
| 186 | 1.034 | 0.969 | 1.368 | 0.00410 | 599,428 |
| 202 | 0.974 | 0.913 | 1.289 | 0.00502 | 613,424 |
| 218 | 0.952 | 0.893 | 1.260 | 0.00567 | 647,076 |
| 234 | 0.896 | 0.840 | 1.186 | 0.00687 | 653,494 |
| 250 | 0.861 | 0.807 | 1.139 | 0.00795 | 670,881 |
| 266 | 0.818 | 0.767 | 1.083 | 0.00936 | 678,118 |
| 282 | 0.750 | 0.703 | 0.992 | 0.01182 | 659,118 |
| 298 | 0.724 | 0.678 | 0.958 | 0.01341 | 672,203 |
| 314 | 0.664 | 0.623 | 0.880 | 0.01676 | 650,409 |
| 330 | 0.625 | 0.586 | 0.827 | 0.01990 | 643,052 |
| 346 | 0.560 | 0.525 | 0.741 | 0.02600 | 603,942 |
| 362 | 0.485 | 0.455 | 0.643 | 0.03619 | 547,846 |

TABLE 6

Large-Scale Power Measurement Extrapolations (FIG. 8 Device)

| Weight (oz) | wheel ω (rad/s) | Velocity (tip) (ft/s) | λ Vel(tip)/ Vel(app) | PC | Barge Power (watts) |
|---|---|---|---|---|---|
| 32 | 1.801 | 1.689 | 2.384 | 0.00023 | 179,687 |
| 48 | 1.698 | 1.592 | 2.247 | 0.00039 | 254,040 |
| 64 | 1.616 | 1.515 | 2.139 | 0.00058 | 322,355 |
| 80 | 1.536 | 1.440 | 2.033 | 0.00080 | 383,041 |
| 96 | 1.448 | 1.357 | 1.917 | 0.00108 | 433,362 |
| 112 | 1.383 | 1.297 | 1.831 | 0.00138 | 482,904 |
| 128 | 1.306 | 1.224 | 1.729 | 0.00177 | 521,185 |
| 144 | 1.247 | 1.169 | 1.650 | 0.00218 | 559,728 |
| 160 | 1.191 | 1.117 | 1.577 | 0.00266 | 594,126 |
| 176 | 1.136 | 1.065 | 1.504 | 0.00321 | 623,575 |
| 192 | 1.076 | 1.009 | 1.424 | 0.00391 | 643,928 |
| 208 | 1.007 | 0.944 | 1.333 | 0.00483 | 653,184 |
| 224 | 0.930 | 0.872 | 1.232 | 0.00610 | 649,703 |
| 240 | 0.873 | 0.818 | 1.155 | 0.00742 | 652,924 |
| 256 | 0.806 | 0.755 | 1.067 | 0.00929 | 643,099 |

TABLE 7

Large-Scale Power Measurement Extrapolations (FIG. 9 Device)

| Weight (oz) | wheel ω (rad/s) | Velocity (tip) (ft/s) | λ Vel(tip)/ Vel(app) | PC | Barge Power (watts) |
|---|---|---|---|---|---|
| 16 | 1.241 | 1.164 | 1.643 | 0.00024 | 61,909 |
| 24 | 1.206 | 1.130 | 1.596 | 0.00039 | 90,210 |
| 32 | 1.182 | 1.108 | 1.564 | 0.00054 | 117,875 |
| 40 | 1.155 | 1.083 | 1.529 | 0.00071 | 144,031 |
| 48 | 1.133 | 1.062 | 1.500 | 0.00088 | 169,522 |
| 56 | 1.091 | 1.023 | 1.444 | 0.00111 | 190,471 |
| 64 | 1.061 | 0.994 | 1.404 | 0.00134 | 211,624 |
| 72 | 1.021 | 0.957 | 1.352 | 0.00163 | 229,229 |
| 80 | 0.990 | 0.928 | 1.311 | 0.00192 | 247,013 |
| 88 | 0.956 | 0.896 | 1.265 | 0.00227 | 262,261 |
| 96 | 0.887 | 0.832 | 1.174 | 0.00287 | 265,483 |
| 104 | 0.877 | 0.822 | 1.160 | 0.00319 | 284,193 |
| 112 | 0.839 | 0.787 | 1.111 | 0.00375 | 293,012 |
| 120 | 0.818 | 0.767 | 1.083 | 0.00422 | 306,115 |
| 128 | 0.795 | 0.745 | 1.052 | 0.00478 | 317,080 |
| 136 | 0.746 | 0.699 | 0.987 | 0.00576 | 316,267 |
| 144 | 0.725 | 0.680 | 0.960 | 0.00646 | 325,421 |
| 152 | 0.690 | 0.647 | 0.914 | 0.00752 | 327,047 |
| 160 | 0.665 | 0.624 | 0.881 | 0.00852 | 331,854 |
| 168 | 0.614 | 0.576 | 0.813 | 0.01049 | 321,643 |
| 176 | 0.595 | 0.558 | 0.788 | 0.01171 | 326,440 |
| 184 | 0.562 | 0.527 | 0.744 | 0.01373 | 322,291 |
| 192 | 0.523 | 0.490 | 0.692 | 0.01653 | 313,080 |
| 200 | 0.494 | 0.463 | 0.654 | 0.01931 | 307,992 |
| 208 | 0.461 | 0.432 | 0.610 | 0.02309 | 298,708 |
| 216 | 0.450 | 0.422 | 0.595 | 0.02515 | 302,875 |
| 224 | 0.466 | 0.436 | 0.616 | 0.02435 | 325,107 |

Hence, again, these overall results show the viability of such a unique, inventive paddlewheel system to generate high amounts of electrical power through the capture of hydrokinetic energy at levels heretofore unattained.

FIGS. 11, 12, 13, and 14 thus show examples of floating vessels 350, 360, 370, 380 (here, barges), incorporating the inventive paddlewheel system 600, 610, 620, 630 at a large-scale level. The systems 600, 610, 620, 630 include the same configured venturis 640, 650, 660, 670 as described in the FIGS. 1, 2, 4, and 5, above. The paddlewheels 700, 710, 720, 730 are thus connected to the base barge structures 705, 715, 725, 735, through a standing pedestal 706, 716, 726, 736, and a movable arm 707, 717, 727, 737, that may be tightened and loosened via a bolt 708, 718, 728. 738, thus allowing for raising or lowering of the wheel 700, 710, 720, 730 as needed for optimum placement within the moving water 750, 760, 770, 780. The side walls of the venturi 640, 650, 660, 670 are created by pontoon structures (not illustrated) that are connected by bottom panels (not illustrated) that form the bottom surfaces 645, 655, 665, 675 of the venturis 640, 650, 660, 670 as well as the side wall structures (not illustrated), thereof. The flat-bottom system (600 of FIG. 11) will not include any room within the venturi bottom portions for ballast tanks. However, the remaining systems, (620 of FIG. 12, 630 of FIG. 13, 640 of FIG. 14) may be configured to make proper utilization of such empty space by including ballast tanks (not illustrated) within those areas, thus closing off the actual bottom portions (655 of FIG. 12, 665 of FIG. 13, 675 of FIG. 14) for such a purpose. The paddlewheel systems 600, 610, 620, 630 are thus connected to a base floor 705, 715, 725, 735, and underneath a main floor 800, 810, 820, 830. Included on such barges 350, 360, 370, 380 are an engine room that includes an engine room 840, 850, 860, 870, a housing component 842, 852, 862, 872, a pilot house 844, 854, 864, 874, a hydrogen/oxygen generating system 846, 856, 866, 876 and any other facilities that may be needed to that extent. The barges 350, 360, 370, 380 also include access areas for an operator to repair, replace, or otherwise work on any part of the paddlewheel system itself. Additionally, the overall device includes a means to shut either or both of the ingress and egress portions of the venturi, again, if necessary (not illustrated). The water flow 395 (for each of FIGS. 11-14) will thus flow into the paddlewheel system 600, 610, 620, 630 and drive the wheel as noted to generate electricity.

Furthermore, if desired, the entire barge may include any combination of other clean power generation equipment, such as solar panels 900, 910, 920, 930 and/or wind turbines 905, 915, 925, 935, located on top of the top floor (here, the main floor; any number of floors may be provided, as long as the vessel does not suffer from imbalances as a result thereof) to permit solar and wind access thereto. Such devices do not provide the same degree of power generation as the paddlewheel system (even with multiple panels and turbines present), ostensibly because the hydrokinetic energy involved is not only very strong (and, again, increased significantly with the venturi design employed herein), but also due to the continuous nature of such a device when present within a flowing water source. As such, although such extra power generation means may also provide power to an external user (or into a power grid), it is a primary reason for these devices to provide the base power potentially needed for the operators of the floating vessel (such as internal electrical power, navigation purposes to maneuver the vessel, and other end-. uses).

The paddlewheel system 600, 610, 620, 630 would have connected to it an electrical generator (such as, for example, without limitation, a dynamo) (not illustrated), that moves in concert with the rotation of the paddlewheel itself. Such an electrical generator may then transfer the electrical charges made thereby to a proper storage device or to a transfer device to subsequently send such electrical charges anywhere desired. In this manner, the limitations as to power generation would most likely be limited to any degradation of storage capacity, charge transfer, and/or kinetic energy loss from the translation of hydrokinetic energy to rotational energy to, ultimately, electrical energy. Knowing this is a possible occurrence, and, as such, is a problem with any paddlewheel device, the increase in water flow velocity provided through the inventive paddlewheel system itself, compensates for such potential losses through initial increases in power generation levels as a result. In effect, this inventive paddlewheel/venturi design provides the highest efficiency, safest, cleanest, and most continuous, manner of generating electrical (or other) power known to date.

Alternatively, the paddlewheel itself may be configured to include the proper dynamo (or other electrical generator) components within the axle region thereof. In such a situation, the rotation wheel would include the necessary metal components to react with a stationary magnet located along the axle line of the wheel itself. In such a design, the entire hydrokinetic electricity generator system would basically be encapsulated within a single device requiring only proper alignment within the venturi and a proper flowing source to be introduced for reliable and proper operation to commence.

Additionally, it is important to note that such inventive barges 350, 360, 370, 380 may include a single paddlewheel system 600, 610, 620, 630 if desired, or, in other preferred embodiments, multiple paddlewheel systems may be employed to provide increased power generation possibilities as well, either in series or side-by-side.

Importantly, then, is the overall concept of incorporating such high-performing paddlewheel systems into floating vessels for the purpose of transporting such power generating devices to any selected location on a flowing riparian (or other water) source as needed by the operator. As alluded to above, such a floating vessel may then, in turn, be useful to any number of desired purposes. One potential reason could be to provide plentiful, clean, and inexpensive power to a location or region that has suffered from a natural disaster. Such vessels may easily maneuver to a necessary location fur such a purpose and provide, in addition to power, a means to treat victims of such an occurrence and could also include any number of added components to that effect. Through the power generator itself, the entire vessel may be an all-in-one floating hospital that may provide water purifiers, oxygen and hydrogen generators, and furthermore, the potential to produce hydrogen peroxide with the proper reactor in place to allow for gaseous oxygen and hydrogen to be added to an anthraquinone base compound (as one possible example), with a further reaction to cleave the peroxide from the resultant product. Such a disinfecting agent thus could be produced in adequate supply to offer further aid to such disaster victims.

Additionally, the barge may include, again, if desired, and as shown in FIGS. 11-14, a communication assembly (including, at least, a satellite transmitter for audio and potentially visual signals) (not illustrated). This system would help the user, for whatever function, to properly relay information and receive notifications, etc., of any type (such as, weather issues, machinery concerns, etc.) to their benefit, as well.

Likewise, the vessel may be present solely for the purpose of providing power to an individual business, or possibly to a power grid, and may include housing and dining facilities for persons on-board that are monitoring and operating such a floating power plant. In other words, the possible uses for such a floating vessel are myriad (such a vessel may be used for any purpose that is conducive to a presence on a water source, including a set of apartments, a hospital, an entire collection of retail establishments, a recording studio; the list of possible uses is endless. As long as the base inventive paddlewheel system as described herein is present, then the floating vessel is considered within the scope of the overall concept. As such, the overall size of such a floating vessel is not limited by any rationale, particularly since the inventive paddlewheel device may be of any size itself. Additionally, if desired, such a floating vessel (and thus paddlewheel system) may be operated remotely with limited necessary human interaction and/or the overall vessel may actually be constructed in a permanent fashion, if desired, as long as the location is appropriate for such an edification and the inventive paddlewheel system is employed therein.

Furthermore, the floating vessel may be of any type that is conducive to the incorporation of such a power-generating paddlewheel system. Thus, any flat-bottomed floating vessel, or, perhaps, sufficiently large ship with a portion designated for paddlewheel system inclusion, may be utilized for such a purpose. As well, the floating vessel may be stationed at a set location by any means, including anchoring to a water source bed, or including stanchions (such as 980 in FIGS. 11-14, with a proper line 990 providing such a connection) dedicated to specific locations in a flowing water source to which such a vessel may be moored securely to remain in place as long as desired by an operator. The operator may, as well, determine that certain locations in a riparian source are more suitable than other (either due to heavy watercraft traffic or possibly due to certain locations exhibiting higher water flow velocities than others within the target flowing water source); the capability of maneuvering the vessel to such desirable locations can thus be permitted through such a unique power plant barge.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed is:

1. A floating power generating vessel configured to be placed within a flowing body of water including a paddlewheel power generation system, wherein said system comprises a suitable paddlewheel including a plurality of radially configured blades, wherein said paddlewheel is situated within an artificial channel made from a solid material such that said channel includes a closed bottom portion, two closed sides, two open ends, and an open top portion, wherein said paddlewheel is positioned at a location above said artificial channel but also in a configuration to allow for a portion thereof to always be extended into said artificial channel and to allow for a portion thereof to always be present external to said artificial channel, wherein said paddlewheel is situated properly to permit rotation thereof in the same direction as a fluid passing through said artificial channel;

wherein said body of water includes a water flow external to said paddlewheel system while simultaneously flowing through said paddlewheel system;

wherein said artificial channel is configured to allow for said flowing water source to pass therethrough and to contact said paddlewheel blades such that upon proper contact with said paddlewheel blades, said flowing water source causes said paddlewheel to rotate, thereby capturing the hydrokinetic energy present within the flowing water source; and wherein said artificial channel is configured to generate a water flow velocity through said artificial channel in excess of the water flow velocity of the flowing fluid source external to said artificial channel.

2. The floating power generating vessel of claim 1, wherein said artificial channel is configured into at least three separate components, wherein a first component includes a water ingress portion, a second component includes a paddlewheel/water contact portion, and a third component includes a water egress portion.

3. The floating power generating vessel of claim 2 wherein said first, second, and third components of said artificial channel are each defined by a leading edge and a finishing edge.

4. The floating power generating vessel of claim 3 wherein said leading edge of said first component is at the same height as the finishing edge of said third component.

5. The floating power generating vessel of claim 4 wherein the shape of said first component as determined from its leading edge to its finishing edge is the exact reverse of the shape of said third component as determined from its leading edge to its finishing edge.

6. The floating power generating vessel of claim 5 wherein said artificial channel includes first, second, and third components that are of a flat shape.

7. A method of utilizing the floating power generating vessel of claim 1 to generate electrical power, wherein said vessel includes an electrical generator connected to said paddlewheel, said method including the steps of:

placing said vessel within a flowing body of water wherein said body of water simultaneously flows both externally to said artificial channel and through said artificial channel, wherein the velocity of said water flowing through said artificial channel is greater than the velocity of said water flowing externally to said artificial channel;

allowing said body of water to flow through said artificial channel and contact said paddlewheel, wherein said water flow generates rotational energy of said paddlewheel that transfers to said electrical generator; and wherein said electrical generator generates said electrical power.

8. A method of utilizing the floating power generating vessel of claim 2 to generate electrical power, wherein said vessel includes an electrical generator connected to said paddlewheel, said method including the steps of:

placing said vessel within a flowing body of water wherein said body of water simultaneously flows both externally to said artificial channel and through said artificial channel, wherein the velocity of said water flowing through said artificial channel is greater than the velocity of said water flowing externally to said artificial channel;

allowing said body of water to flow through said artificial channel and contact said paddlewheel, wherein said water flow generates rotational energy of said paddlewheel that transfers to said electrical generator; and wherein said electrical generator generates said electrical power.

9. A method of utilizing the floating power generating vessel of claim 3 to generate electrical power, wherein said vessel includes an electrical generator connected to said paddlewheel, said method including the steps of:

placing said vessel within a flowing body of water wherein said body of water simultaneously flows both externally to said artificial channel and through said artificial channel, wherein the velocity of said water flowing through said artificial channel is greater than the velocity of said water flowing externally to said artificial channel;

allowing said body of water to flow through said artificial channel and contact said paddlewheel, wherein said water flow generates rotational energy of said paddlewheel that transfers to said electrical generator; and wherein said electrical generator generates said electrical power.

10. A method of utilizing the floating power generating vessel of claim 4 to generate electrical power, wherein said vessel includes an electrical generator connected to said paddlewheel, said method including the steps of:

placing said vessel within a flowing body of water wherein said body of water simultaneously flows both externally to said artificial channel and through said artificial channel, wherein the velocity of said water flowing through said artificial channel is greater than the velocity of said water flowing externally to said artificial channel;

allowing said body of water to flow through said artificial channel and contact said paddlewheel, wherein said water flow generates rotational energy of said paddlewheel that transfers to said electrical generator; and wherein said electrical generator generates said electrical power.

11. A method of utilizing the floating power generating vessel of claim 5 to generate electrical power, wherein said vessel includes an electrical generator connected to said paddlewheel, said method including the steps of:

placing said vessel within a flowing body of water wherein said body of water simultaneously flows both externally to said artificial channel and through said artificial channel, wherein the velocity of said water flowing through said artificial channel is greater than the velocity of said water flowing externally to said artificial channel;

allowing said body of water to flow through said artificial channel and contact said paddlewheel, wherein said water flow generates rotational energy of said paddlewheel that transfers to said electrical generator; and wherein said electrical generator generates said electrical power.

12. A method of utilizing the floating power generating vessel of claim 6 to generate electrical power, wherein said vessel includes an electrical generator connected to said paddlewheel, said method including the steps of:
- placing said vessel within a flowing body of water wherein said body of water simultaneously flows both externally to said artificial channel and through said artificial channel, wherein the velocity of said water flowing through said artificial channel is greater than the velocity of said water flowing externally to said artificial channel;
- allowing said body of water to flow through said artificial channel and contact said paddlewheel, wherein said water flow generates rotational energy of said paddlewheel that transfers to said electrical generator; and
- wherein said electrical generator generates said electrical power.

* * * * *